US011262936B2

(12) United States Patent
Ishii et al.

(10) Patent No.: US 11,262,936 B2
(45) Date of Patent: Mar. 1, 2022

(54) MEMORY CONTROLLER, STORAGE DEVICE, INFORMATION PROCESSING SYSTEM, AND MEMORY CONTROL METHOD

(71) Applicant: SONY CORPORATION, Tokyo (JP)

(72) Inventors: Ken Ishii, Tokyo (JP); Hiroyuki Iwaki, Kanagawa (JP); Kenichi Nakanishi, Tokyo (JP); Yasushi Fujinami, Tokyo (JP); Tatsuo Shinbashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 272 days.

(21) Appl. No.: 15/768,597

(22) PCT Filed: Jul. 27, 2016

(86) PCT No.: PCT/JP2016/071997
§ 371 (c)(1),
(2) Date: Apr. 16, 2018

(87) PCT Pub. No.: WO2017/073127
PCT Pub. Date: May 4, 2017

(65) Prior Publication Data
US 2019/0056884 A1   Feb. 21, 2019

(30) Foreign Application Priority Data
Oct. 30, 2015   (JP) .............................. JP2015-214609

(51) Int. Cl.
G06F 12/00     (2006.01)
G06F 3/06      (2006.01)
G06F 12/06     (2006.01)

(52) U.S. Cl.
CPC .......... *G06F 3/0655* (2013.01); *G06F 3/0604* (2013.01); *G06F 3/0611* (2013.01);
(Continued)

(58) Field of Classification Search
CPC ....... G06F 3/061; G06F 3/0655; G06F 3/0656
See application file for complete search history.

(56) References Cited

U.S. PATENT DOCUMENTS

2005/0021921 A1 *  1/2005  Blackmon ........... G06F 13/1631
                                                           711/168
2013/0198434 A1    8/2013  Mylly et al.
(Continued)

FOREIGN PATENT DOCUMENTS

BR    9102549 A   10/1991
CA    2044207 A   12/1991
(Continued)

OTHER PUBLICATIONS

International Search Report and Written Opinion of PCT Application No. PCT/JP2016/071997, dated Nov. 1, 2016, 10 pages of English Translation and 09 pages of ISRWO.
(Continued)

*Primary Examiner* — Baboucarr Faal
(74) *Attorney, Agent, or Firm* — Chip Law Group

(57) ABSTRACT

The write time is to be shortened in a storage device using memories that require different write times from each other, such as nonvolatile memories.
In a memory controller including a plurality of write request holding units and a selection unit, the write request holding units holds a write request with respect to each of a plurality of memory modules that require different write times from one another. The selection unit selects one of the plurality of write request holding units in accordance with memory state information indicating whether each of the plurality of memory modules is in a busy state, and causes outputting of the write request.

12 Claims, 24 Drawing Sheets

(52) U.S. Cl.
CPC .......... *G06F 3/0659* (2013.01); *G06F 3/0679* (2013.01); *G06F 12/00* (2013.01); *G06F 12/06* (2013.01)

(56) References Cited

U.S. PATENT DOCUMENTS

| | | | | |
|---|---|---|---|---|
| 2013/0205051 A1* | 8/2013 | Wang | ................ | H04L 49/90 |
| | | | | 710/56 |
| 2013/0227199 A1* | 8/2013 | Liu | ............. | G06F 12/0246 |
| | | | | 711/103 |
| 2014/0195564 A1* | 7/2014 | Talagala | ............ | G06F 11/141 |
| | | | | 707/802 |
| 2015/0177986 A1 | 6/2015 | Kondo | | |

FOREIGN PATENT DOCUMENTS

| | | |
|---|---|---|
| CN | 104081366 A | 10/2014 |
| CN | 104603768 A | 5/2015 |
| DE | 69127782 T2 | 3/1998 |
| EP | 465847 A2 | 1/1992 |
| JP | 04-044136 A | 2/1992 |
| JP | 2001-154913 A | 6/2001 |
| JP | 2014-049091 A | 3/2014 |
| JP | 2014-154119 A | 8/2014 |
| JP | 2015-511350 A | 4/2015 |
| KR | 10-2014-0116408 A | 10/2014 |
| KR | 10-2015-0052039 A | 5/2015 |
| TW | 201411551 A | 3/2014 |
| WO | 2013/110847 A1 | 8/2013 |
| WO | 2014/038223 A1 | 3/2014 |

OTHER PUBLICATIONS

International Preliminary Report on Patentability of PCT Application No. PCT/JP2016/071997, dated May 11, 2018, 11 pages of English Translation and 06 pages of IPRP.

* cited by examiner

MEMORY CONTROLLER, STORAGE DEVICE, INFORMATION PROCESSING SYSTEM, AND MEMORY CONTROL METHOD

CROSS REFERENCE TO RELATED APPLICATIONS

This application is a U.S. National Phase of International Patent Application No. PCT/JP2016/071997 filed on Jul. 27, 2016, which claims priority benefit of Japanese Patent Application No. JP 2015-214609 filed in the Japan Patent Office on Oct. 30, 2015. Each of the above-referenced applications is hereby incorporated herein by reference in its entirety.

TECHNICAL FIELD

The present technology relates to a memory controller, a storage device, an information processing system, and a memory control method. More specifically, the present technology relates to a memory controller, a storage device, an information processing system, and a memory control method for controlling memories that require variable write times, such as nonvolatile memories.

BACKGROUND ART

Conventionally, an information processing system includes a storage device that is formed with dynamic random access memories (DRAMs) as volatile memories and nonvolatile memories. Here, the nonvolatile memories may be NAND flash memories, resistance RAMs (ReRAMs), or the like. In such a storage device, data is accessed in accordance with a command issued by the host computer of the information processing system. To increase the processing capacity of the information processing system, high-speed access to the storage device is required. For example, there is a system suggested for recording the history of commands issued to DRAMs in a memory controller in a storage device including the DRAMs. In this system, the order of commands to be newly issued is changed in accordance with the recorded history, and thus, the time required for accessing data is shortened (see Patent Document 1, for example).

CITATION LIST

Patent Document

Patent Document 1: Japanese Patent Application Laid-Open No. 2014-154119

SUMMARY OF THE INVENTION

Problems to be Solved by the Invention

According to the above conventional technique, the banks of DRAMs in a busy state due to precharging or the like are identified in accordance with a command history through issued commands, and commands are preferentially issued to the other banks, so that the time required for accessing data can be shortened. DRAMs require constant times for precharging, writing, and the like, and it is possible to predict the time required for a return from a busy state. Accordingly, the command issuance order can be easily changed, and the time required for writing or the like can be shortened.

In a nonvolatile memory such as a ReRAM, on the other hand, it is necessary to perform verification to determine whether writing has been properly performed. If the result of the verification shows that writing has not been properly performed, writing is performed again in the nonvolatile memory. In this manner, the time required for writing is not constant in a nonvolatile memory. If the above conventional technique is applied to a storage device including such nonvolatile memories, the command issuance order cannot be appropriately changed, and the time required for writing cannot be shortened.

The present technology has been developed in view of such circumstances, and an object thereof is to shorten the writing time in a storage device that uses memories requiring variable write times, such as nonvolatile memories.

Solutions to Problems

The present technology has been developed to solve the above problems, and a first aspect thereof is a memory controller that includes: a plurality of write request holding units that hold a write request with respect to each of a plurality of memory modules, the write request being issued to request writing in each of the plurality of memory modules, the memory modules requiring different write times from one another; and a selection unit that selects one of the plurality of write request holding units in accordance with memory state information indicating whether each of the plurality of memory modules is in a busy state, and causes outputting of the write request. The first aspect of the present technology is also a memory control method. Here, a memory module is a module that stores data, and is a module formed with a single memory chip or a plurality of memory chips or the like. The memory modules can be accessed independently of one another, and writing can be performed on the memory modules in parallel. Also, a busy state is a state in which any new write request cannot be executed with respect to the memory module. With this configuration, one of the plurality of write request holding units corresponding to the respective memory modules is selected in accordance with the memory state information indicating whether the memory module is in a busy state, and the write request is outputted.

Also, in the first aspect, the selection unit may select one of the plurality of write request holding units corresponding to the memory modules that are not in a busy state. With this arrangement, the write request holding unit corresponding to a memory module not in a busy state is selected, and the write request is outputted.

Further, in the first aspect, the write request holding units may be formed with queues that perform first-in first-out operations on the write request. With this arrangement, write requests are processed in the first-in first-out order.

Also, in the first aspect, the memory controller may further include a memory state information holding unit that holds the memory state information, and the selection unit may select one of the plurality of write request holding units in accordance with the memory state information held in the memory state information holding unit. With this arrangement, a write request holding unit is selected in accordance with the held memory state information, and the write request is outputted.

Further, in the first aspect, the memory controller may further include a data processing unit that performs predetermined preprocessing on write data associated with the write request before being outputted to the memory module. Here, the preprocessing is the processing to be performed before write data is outputted to the memory module. With this arrangement, predetermined preprocessing is performed on write data.

Also, in the first aspect, the data processing unit may perform an encoding process to add parity for error detection and error correction to the write data associated with the write request, and the encoding process may be performed as the predetermined preprocessing. With this arrangement, a write data encoding process is performed as the predetermined preprocessing.

Further, in the first aspect, the data processing unit may perform a process of reading the write data associated with the write request from the host computer, and the process may be performed as the predetermined preprocessing. With this arrangement, a write data reading process is performed as the predetermined preprocessing.

Also, in the first aspect, the memory controller may further include a data holding unit that holds the write data subjected to the predetermined preprocessing. With this arrangement, the write data subjected to the predetermined preprocessing is saved.

Further, in the first aspect, if the write data is not held in the data holding unit, the selection unit may select one of the plurality of write request holding units in accordance with the memory state information. With this arrangement, if the write data subjected to the predetermined preprocessing is not held in the data holding unit, one of the plurality of write request holding units is selected, and the write request is outputted.

Also, in the first aspect, the selection unit may select one of the plurality of write request holding units corresponding to the memory modules not in a busy state, and, if all the memory modules are in a busy state, the selection unit may select one of the plurality of write request holding units corresponding to the memory modules in a busy state. With this arrangement, in a case where the write data is not held in the data holding unit, the selection unit selects a write request holding unit, and, in a case where all the memory modules are in a busy state, one of the plurality of write request holding units corresponding to the memory modules in a busy state is selected.

Further, in the first aspect, the plurality of write request holding units may hold the write request and write data associated with the write request with respect to each of the plurality of memory modules, and the selection unit may select one of the plurality of write request holding units in accordance with the memory state information, and cause outputting of the write request and the write data. With this configuration, one of the plurality of write request holding units corresponding to the respective memory modules is selected in accordance with the memory state information indicating whether the memory module is in a busy state, and the write request and write data are outputted.

Further, a second aspect of the present technology is a storage device that includes: a plurality of memory modules requiring different write times from one another; a plurality of write request holding units that hold a write request with respect to each of the plurality of memory modules, the write request being issued to request writing in each of the plurality of memory modules; and a selection unit that selects one of the plurality of write request holding units in accordance with memory state information indicating whether each of the plurality of memory modules is in a busy state, and causes outputting of the write request. With this configuration, one of the plurality of write request holding units corresponding to the respective memory modules is selected in accordance with the memory state information indicating whether the memory module is in a busy state, and the write request is outputted.

Further, a third aspect of the present technology is an information processing system that includes: a storage device including: a plurality of memory modules requiring different write times from one another; a plurality of write request holding units that hold a write request with respect to each of the plurality of memory modules, the write request being issued to request writing in each of the plurality of memory modules; and a selection unit that selects one of the plurality of write request holding units in accordance with memory state information indicating whether each of the plurality of memory modules is in a busy state, and causes outputting of the write request; and a host computer that requests the storage device to perform the writing. With this configuration, one of the plurality of write request holding units corresponding to the respective memory modules is selected in accordance with the memory state information indicating whether the memory module is in a busy state, and the write request is outputted.

Effects of the Invention

According to the present technology, it is possible to achieve an excellent effect to shorten the write time in a storage device that uses memories requiring variable write times. It should be noted that the effect of the present technology is not necessarily limited to that described herein, and may be any effect described in the present disclosure.

MODE FOR CARRYING OUT THE INVENTION

The following is a description of modes for carrying out the present technology (the modes will be hereinafter referred to as the embodiments). Explanation will be made in the following order.

1. First embodiment (an example case where a write request buffer is provided)
2. Second embodiment (an example case where a write request buffer and a write data buffer are provided)
3. Third embodiment (an example case where a write data buffer is provided for each memory module)
4. Fourth embodiment (an example case where a write command is held in a queue)
5. Fifth embodiment (an example case where a write request and write data are held in a queue)
6. Sixth embodiment (an example case where a queue is selected in accordance with memory state information)
7. Modifications 1. First Embodiment

[Configuration of an Information Processing System]

Figure 1:
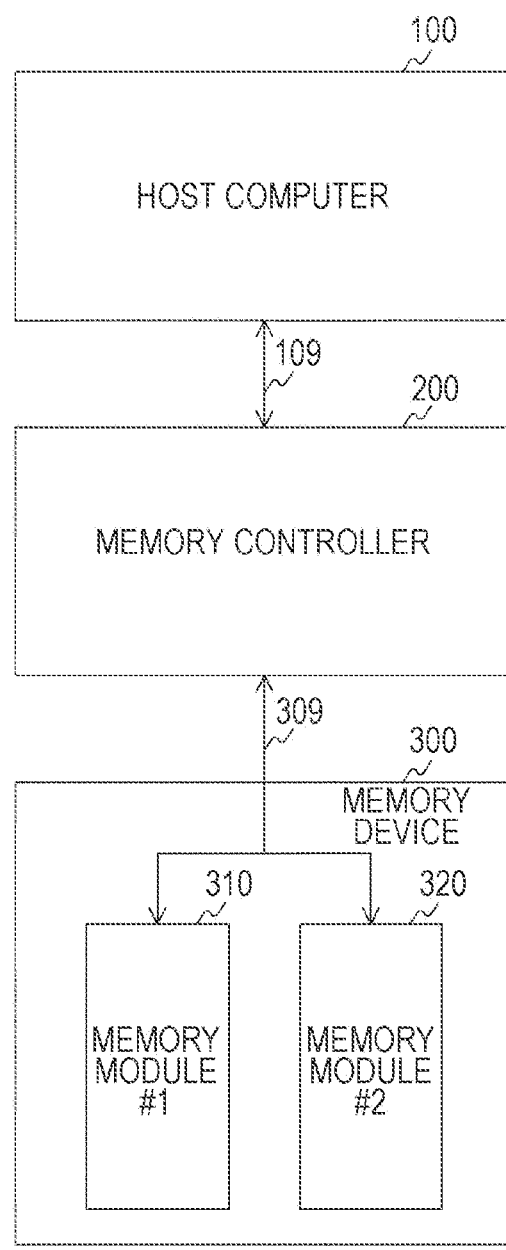
FIG. 1 is a diagram showing an example configuration of an information processing system according to an embodiment of the present technology.

FIG. 1 is a diagram showing an example configuration of an information processing system according to an embodiment of the present technology. The information processing system shown in the drawing includes a host computer 100, a memory controller 200, and a memory device 300. It should be noted that the memory controller 200 and the memory device 300 constitute a storage device.

The host computer 100 performs various kinds of processes in the information processing system. The host computer 100 issues a command such as a write command or a read command to the memory device 300 via the memory controller 200, and requests writing and reading. A signal line 109 is a signal line that electrically connects the host computer 100 and the memory controller 200 to each other.

The memory controller 200 is designed to control the memory device 300. The memory controller 200 interprets write and read commands issued from the host computer 100, and issues write and read requests based on the interpretation to the memory device 300.

The memory device 300 is designed to store data. This data is accessed in accordance with a request issued from the memory controller 200. At this stage, data is transferred between the memory device 300 and the memory controller 200. The memory device 300 is formed with a plurality of memory modules. Here, a memory module is a module that stores data, and is a module formed with a single memory chip or a plurality of memory chips or the like. The memory device 300 shown in the drawing is formed with two memory modules, for example. Specifically, the memory device 300 in the drawing includes a memory module #1 (310) and a memory module #2 (320). Each of these memory modules can be accessed independently, and writing can be performed on these memory modules in parallel.

Further, a memory chip is formed with a ReRAM that is a nonvolatile memory, for example. This ReRAM is a semiconductor memory that stores data by reversibly changing the resistance values of memory elements disposed in the memory cell. For example, data can be stored, with the value "1" being associated with a high-resistance state (HRS) of a memory element, the value "0" being associated with a low-resistance state (LRS). Conversely, it is also possible to associate the value "0" with HRS, and associate the value "1" with LRS. Further, a process of switching a memory element from HRS to LRS is referred to as a set process, and a process of switching a memory element from LRS to HRS is referred to as a reset process. As the set process and the reset process are performed, desired data can be written into a memory cell. It should be noted that the ReRAM is accessed page by page. Therefore, the set process and the reset process are also performed page by page.

A signal line 309 is a signal line that electrically connects the memory controller 200 and the memory device 300 to each other.

When requesting writing, the host computer 100 issues a write command and accompanying write data to the memory controller 200. Here, the write command is a command formed with an operation code indicating writing, the write destination address, the number of write data pieces, and the address of the write data in the storage area of the host computer 100. The memory controller 200 generates a write request in accordance with the write command, issues the address of the write data to the host computer 100, and requests transfer of the write data. After that, the write data transferred from the host computer 100 to the memory controller 200 is outputted to the memory device 300 together with the write request. At this stage, the memory controller 200 designates one of the memory modules #1 (310) and #2 (320) as the current write target memory module. The memory controller 200 also performs address translation to translate the write destination address included in the write command into the address of the page and the memory module number. Here, the memory module number is the number for designating the above mentioned memory module #1 (310) or the like. The memory device 300 performs writing in accordance with this request. After that, the memory device 300 outputs the result of the writing as a response to the memory controller 200.

[Configurations of Memory Modules]

Figure 2A:
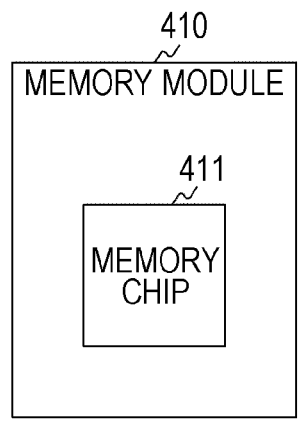
FIGS. 2a and 2b are diagrams showing example configurations of memory modules according to the embodiment of the present technology.
Figure 2B:
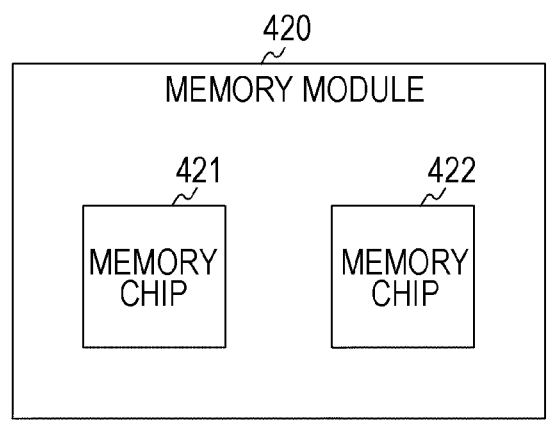

FIGS. 2a and 2b are diagrams showing example configurations of memory modules according to the embodiment of the present technology. This drawing shows example configurations the memory modules described above with reference to FIG. 1. In the drawing, "FIG. 2a" indicates the configuration of a memory module 410 including a memory chip 411. In the drawing, "FIG. 2b" indicates the configuration of a memory module 420 including memory chips 421 and 422.

[Configuration of the Memory Controller]

Figure 3:
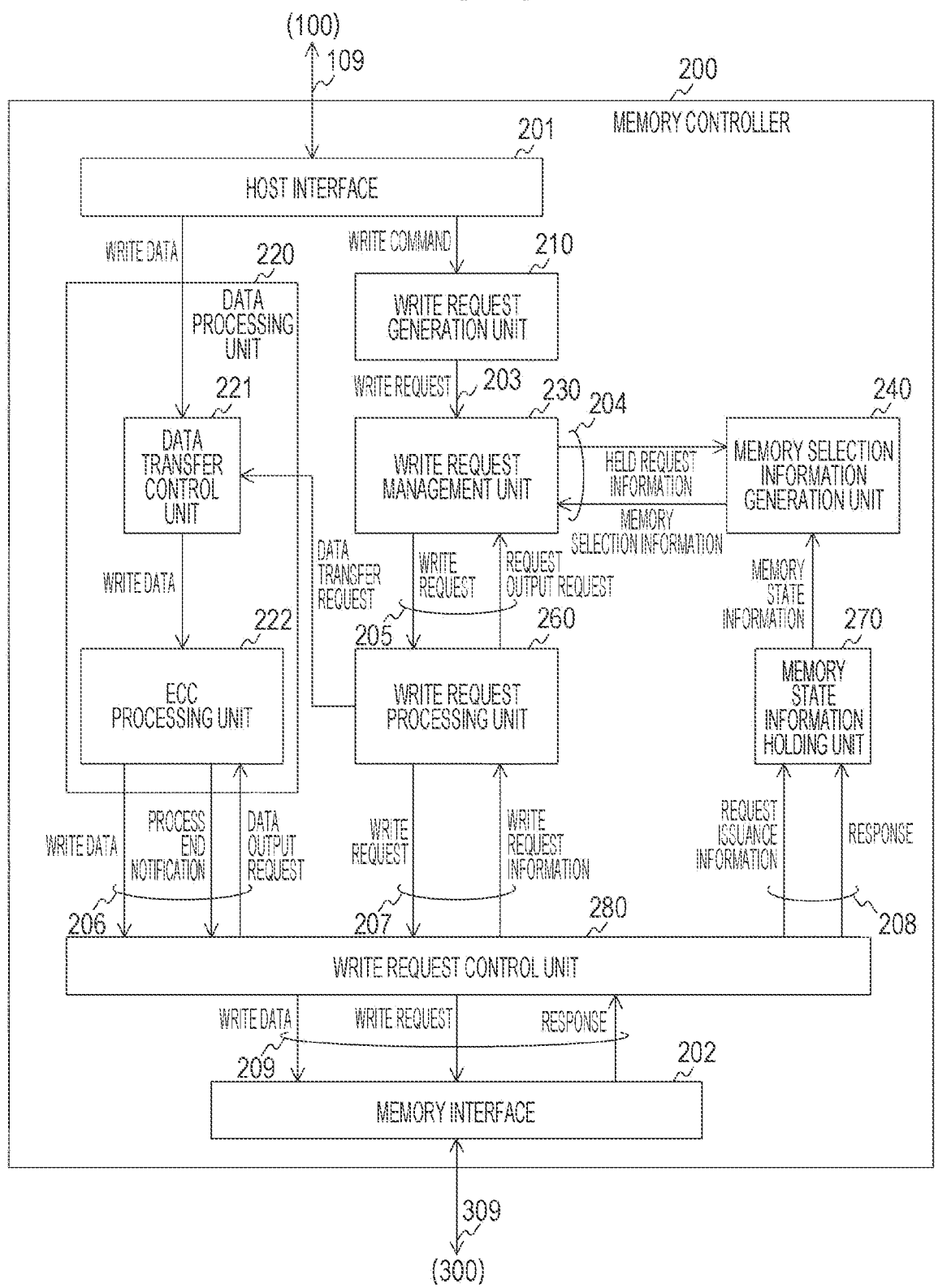
FIG. 3 is a diagram showing an example configuration of a memory controller 200 according to a first embodiment of the present technology.

FIG. 3 is a diagram showing an example configuration of the memory controller 200 according to the first embodiment of the present technology. The memory controller 200 includes a host interface 201, a write request generation unit 210, a data transfer control unit 221, and a write request management unit 230. In addition, the memory controller 200 further includes a memory selection information generation unit 240, an ECC processing unit 222, a write request processing unit 260, a memory state information holding unit 270, a write request control unit 280, and a memory interface 202. It should be noted that the data transfer control unit 221 and the ECC processing unit 222 constitute a data processing unit 220.

The host interface 201 is an interface that exchanges data with the host computer 100. The memory interface 202 is an interface that exchanges data with the memory device 300.

The write request generation unit 210 interprets a write command issued by the host computer 100, and generates a write request. The write request generation unit 210 also performs the above described address translation.

The data transfer control unit 221 controls transfer of write data. The data transfer control unit 221 performs a data transfer process to read write data from the host computer 100, in accordance with the address of the write data in the storage area of the host computer 100. The address of the write data is included in the write command. This data transfer process is performed in accordance with a data transfer request outputted from the write request processing unit 260, which will be described later.

The ECC processing unit 222 encodes write data. Here, encoding is a process of turning write data into an ECC by adding parity to the write data. In this example, parity generated with the use of Bose Chaudhuri Hocquenghem (BCH) codes can be used as the parity, for example. When the write data is outputted from the data transfer control unit 221, the ECC processing unit 222 starts an encoding process to encode the outputted write data. When the encoding process is ended, the ECC processing unit 222 outputs a process end notification to the write request control unit 280, which will be described later. After that, the ECC processing unit 222 outputs the encoded write data to the write request control unit 280, in accordance with a data output request outputted from the write request control unit 280.

The write request management unit 230 manages write requests generated by the write request generation unit 210. The write request management unit 230 manages the write request in the following manner. First, the write request management unit 230 holds a plurality of write requests corresponding to the respective memory modules #1 (310) and #2 (320) included in the memory device 300. The write request management unit 230 then selects one of the held write requests in accordance with memory selection information outputted from the memory selection information generation unit 240, which will be described later, and outputs the write request to the write request processing unit 260, which will be described later. The outputting of a write request is performed in accordance with a request output request from the write request processing unit 260. The write request management unit 230 also outputs held request information, which is the information indicating whether a request is held, to the memory selection information generation unit 240. The configuration of the write request management unit 230 will be described later in detail.

The write request processing unit 260 performs processing on a write request. The write request processing unit 260 issues a request output request to the write request management unit 230, in accordance with write request information outputted from the write request control unit 280, which will be described later. When a write request is outputted from the write request management unit 230, the write request processing unit 260 outputs the outputted write request to the write request control unit 280, and issues a data transfer request to the data transfer control unit 221.

The write request control unit 280 controls issuance of write requests. The write request control unit 280 includes a write request buffer that holds write requests, and holds write requests outputted from the write request processing unit 260 in this write request buffer. The write request control unit 280 also outputs write request information to the write request processing unit 260. Here, the write request information is information indicating the state of the write request buffer, and is information indicating whether any write request is held in the write request buffer. Further, as described above, the write request control unit 280 issues a data output request to the ECC processing unit 222, in accordance with a process end notification outputted from the ECC processing unit 222. After that, the write request control unit 280 issues the write data output from the ECC processing unit 222 and the write request held in the write request buffer to the memory device 300. This issuance is performed via the memory interface 202. At this stage, the write request control unit 280 outputs request issuance information as the information about the issuance of the write request to the memory state information holding unit 270, which will be described later.

When a response to the issued write request is inputted via the memory interface 202, the write request control unit 280 outputs the response to the memory state information holding unit 270. The configuration of the write request control unit 280 will be described later in detail.

The memory state information holding unit 270 holds information about the states of the memory modules #1 (310) and #2 (320) of the memory device 300. The memory state information holding unit 270 holds memory state information that is the information indicating whether the memory module #1 (310) and the like are in a busy state.

Here, a busy state is a state in which a process is already being performed in the memory module #1 (310) and the like, and is a state in which the memory modules cannot be made to execute a new write request. In addition, a state that is not a busy state is called an idle state. The memory state information holding unit 270 determines whether the memory modules are in a busy state, in accordance with request issuance information and a response outputted from the write request control unit 280. Specifically, a write request is issued, and a memory module that does not output any response is determined to be in a busy state. In accordance with this, the memory state information holding unit 270 generates and holds memory state information, and outputs the memory state information to the memory selection information generation unit 240. The memory state information can be expressed by 1-bit information for each of the memory modules #1 (310) and #2 (320), for example. In that case, the memory state information is represented by the value "1" when the memory module is in a busy state, and is represented by the value "0" when the memory module is not in a busy state.

The memory selection information generation unit 240 is designed to generate memory selection information. The memory selection information generation unit 240 selects a memory module to which a write request is to be issued, in accordance with the held request information outputted from the write request management unit 230 and the memory state information outputted from the memory state information holding unit 270. The result of this selection is then outputted as memory selection information to the write request management unit 230. The selection of a memory module is performed by selecting a memory module that has a request held in the write request management unit 230 and is not in a busy state. Like the above described memory state information, for example, the memory selection information can be expressed by 1-bit information for each of the memory modules #1 (310) and #2 (320). In that case, the value "1" may indicate that the memory module is selected.

In a case where a plurality of selectable memory modules exist, the memory selection information generation unit 240 selects one of the memory modules. As a method for this selection, a method of selecting a plurality of memory modules in a predetermined order can be adopted. For example, it is possible to adopt a method of selecting memory modules in order of memory module number. In this case, the respective memory modules are equally accessed, and therefore, the requests are selected in order of issued commands. Alternatively, it is also possible to adopt a method of selecting the memory module having the smallest memory module number. In this case, memory modules can be selected through a simple process.

The data processing unit 220 performs predetermined preprocessing on write data. Here, the preprocessing is the processing to be performed before write data is outputted to the memory module. As the predetermined preprocessing, for example, it is possible to perform a process of transferring write data from the host computer and a process of encoding the write data. The data processing unit 220 according to the first embodiment of the present technology includes the data transfer control unit 221 and the ECC processing unit 222, and performs a process of transferring write data from the host computer and a process of encoding the write data as the predetermined preprocessing.

[Configuration of the Write Request Management Unit]

Figure 4:
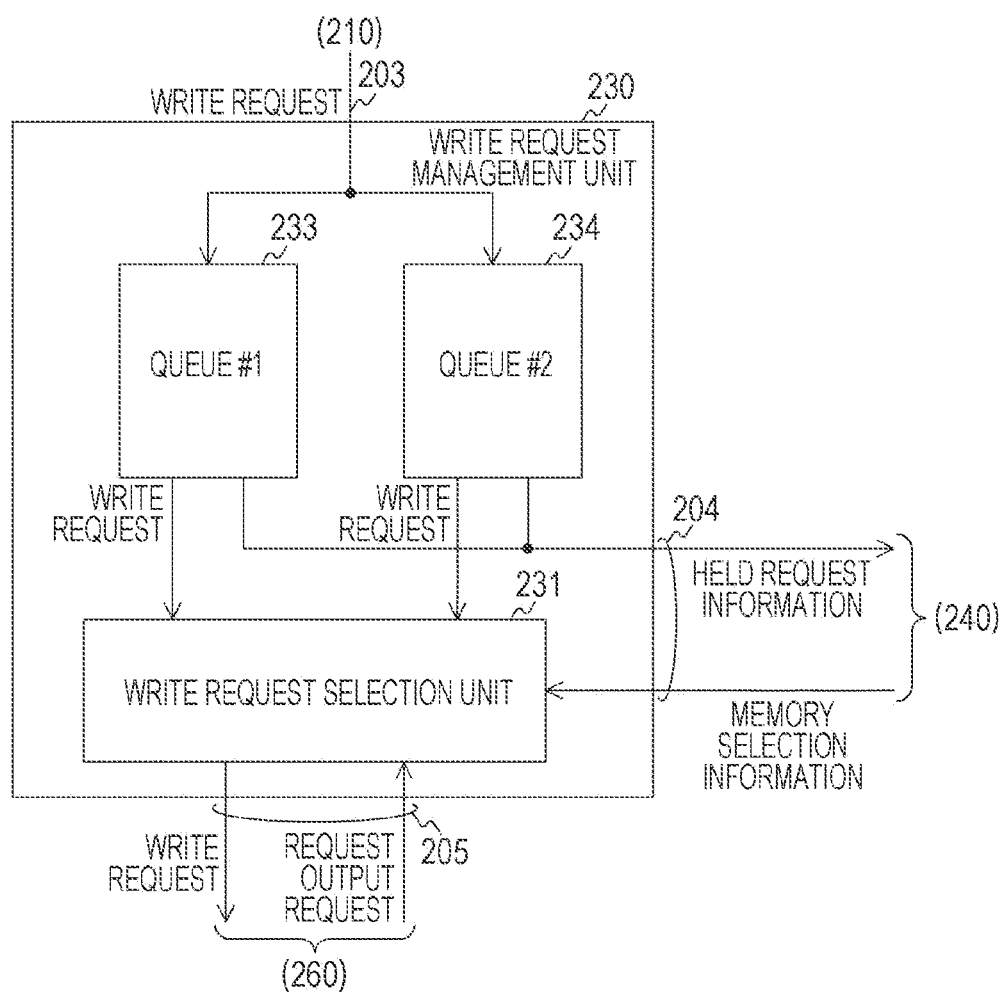
FIG. 4 is a diagram showing an example configuration of a write request management unit 230 according to the first embodiment of the present technology.

FIG. 4 is a diagram showing an example configuration of the write request management unit 230 according to the first embodiment of the present technology. The write request management unit 230 includes a queue #1 (233) and a queue #2 (234), and a write request selection unit 231.

The queue #1 (233) and the queue #2 (234) hold write requests. These queues #1 (233) and #2 (234) have one-to-one correspondence with the memory modules #1 (310) and #2 (320) included in the memory device 300, and hold write requests for writing in these memory modules. For example, the queue #1 (233) holds a write request for writing in the memory module #1 (310), and the queue #2 (234) holds a write request for writing in the memory module #2 (320). In this manner, the write request management unit 230 includes the same number of queues as the memory modules included in the memory device 300.

These queues #1 (233) and #2 (234) perform first-in first-out operations on write requests. That is, the queues #1 (233) and #2 (234) are formed with first-in first-out (FIFO) memories. With this arrangement, the write request corresponding to an earlier-issued write command is processed earlier, and thus, data is written in the intended order in the host computer 100. The queues #1 (233) and #2 (234) also generate the above mentioned held request information, and output the held request information to the memory selection information generation unit 240. This held request information can be expressed by 1-bit information, for example. Specifically, the value "1" can indicate that a write request is held in the queue. Since the memory controller 200 according to the embodiment of the present technology includes the two queues #1 (233) and #2 (234), the size of the held request information to be outputted from the write request management unit 230 is two bits in total. It should be noted that although the above described write request management unit 230 includes the queues #1 (233) and #2 (234), the present technology is not limited to such a configuration. For example, instead of the queues #1 (233) and #2 (234), two storage devices that do not perform first-in first-out operations may be included, and may be made to hold write requests. It should be noted that this storage devices are an example of the write request holding unit of the claims.

The write request selection unit 231 selects one of the queues #1 (233) and #2 (234), and outputs the held write requests. When a request output request from the write request processing unit 260 is inputted, the write request selection unit 231 selects the queue #1 (233) or #2 (234), and retrieves a write request from the selected queue #1 (233) or the like. The write request selection unit 231 then outputs the retrieved write request to the write request processing unit 260. The write request is selected in accordance with the memory selection information outputted from the memory selection information generation unit 240. It should be noted that the write request selection unit 231 is an example of the selection unit of the claims.

[Configuration of the Write Request Control Unit]

Figure 5:
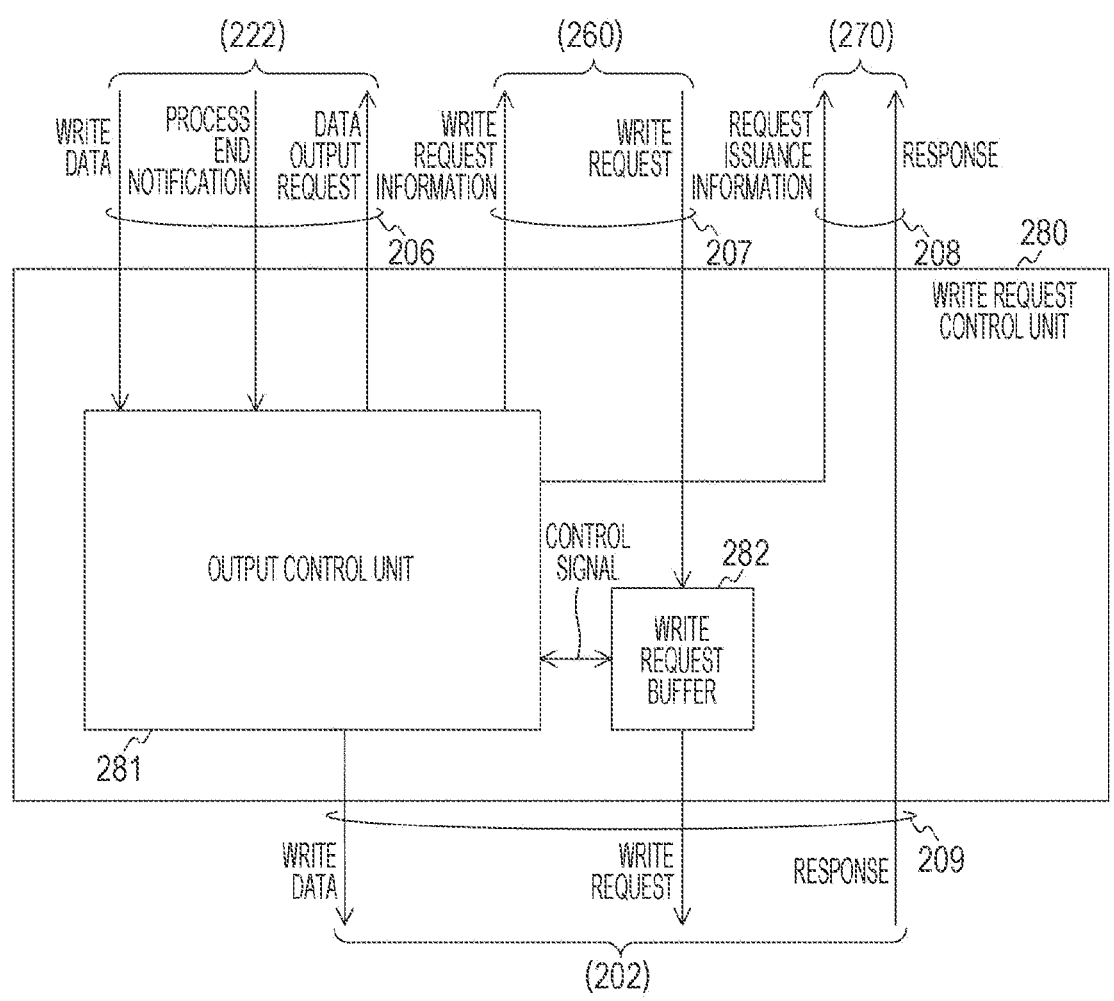
FIG. 5 is a diagram showing an example configuration of a write request control unit 280 according to the first embodiment of the present technology.

FIG. 5 is a diagram showing an example configuration of the write request control unit 280 according to the first embodiment of the present technology. The write request control unit 280 includes an output control unit 281 and a write request buffer 282.

The write request buffer 282 holds and outputs a write request outputted from the write request processing unit 260. The write request buffer 282 is controlled by the output control unit 281, which will be described later.

The output control unit 281 controls outputting of write requests and write data. The output control unit 281 also controls the entire write request control unit 280. The output control unit 281 generates and outputs write request information based on the state of the write request buffer 282. The write request information can be expressed by 1-bit information, for example. Specifically, the value "1" can indicate that a write request is held in the write request buffer 282. In this case, when the write request information is the value "0", the write request processing unit 260 issues a request output request to the write request management unit 230. In response to an input of a processing end notification from the ECC processing unit 222, the output control unit 281 also issues a data output request to the ECC processing unit. After that, when write data is outputted from the ECC processing unit 222, the output control unit 281 causes the write request buffer 282 to output a write request, and outputs the write data. The output control unit 281 then outputs request issuance information.

[Write Process in a Nonvolatile Memory]

Figure 6:
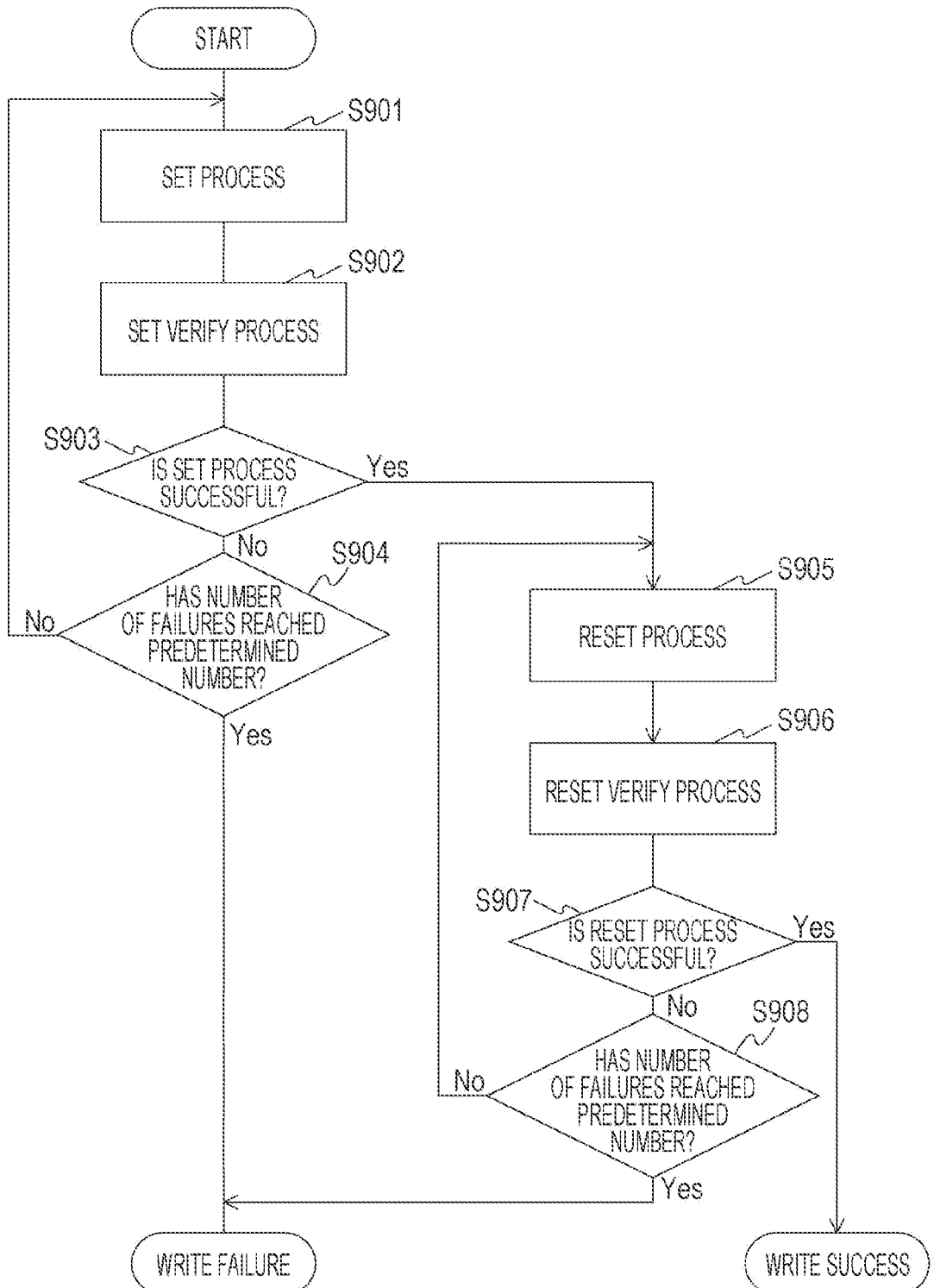
FIG. 6 is a chart showing an example of the processing procedures in a write process according to the embodiment of the present technology.

FIG. 6 is a chart showing an example of the processing procedures in a write process according to the embodiment of the present technology. The chart shows a write process to be performed in a ReRAM. As described above, writing is performed page by page. First, a set process is performed (step S901). A set verify process is then performed (step S902). This process is a process of determining whether the set process has been properly performed. If the set process has failed as a result (step S903: No), the ReRAM determines whether the number of times the set process has failed has reached a predetermined number (step S904). If the number of times the set process has failed is smaller than the predetermined number (step S904: No), the ReRAM again performs the process starting from step S901. If the number of times the set process has failed has reached the predetermined number (step S904: Yes), on the other hand, the ReRAM ends the write process. In this case, the ReRAM outputs a write failure notification as a response to the memory controller 200.

If the set process is successful in step S903 (step S903: Yes), on the other hand, a reset process is performed (step S905), followed by a reset verify process (step S906). This process is a process of determining whether the reset process has been properly performed. If the reset process has failed as a result (step S907: No), the ReRAM determines whether the number of times the reset process has failed has reached a predetermined number (step S908). If the number of times the reset process has failed is smaller than the predetermined number (step S908: No), the ReRAM again performs the process starting from step S905. If the number of times the reset process has failed has reached the predetermined number (step S908: Yes), on the other hand, the ReRAM ends the write process. In this case, the ReRAM also outputs a write failure notification as a response to the memory controller 200. If the reset process is successful in step S907 (step S907: Yes), on the other hand, the ReRAM outputs a response indicating that the writing is successful to the memory controller 200, and then ends the write process.

In this manner, to perform writing in a ReRAM, the set process and the reset process are repeatedly performed in accordance with the results of the verify processes. Therefore, the time required for writing in a ReRAM varies.

[Process to be Performed by the Write Request Management Unit]

Figure 7:
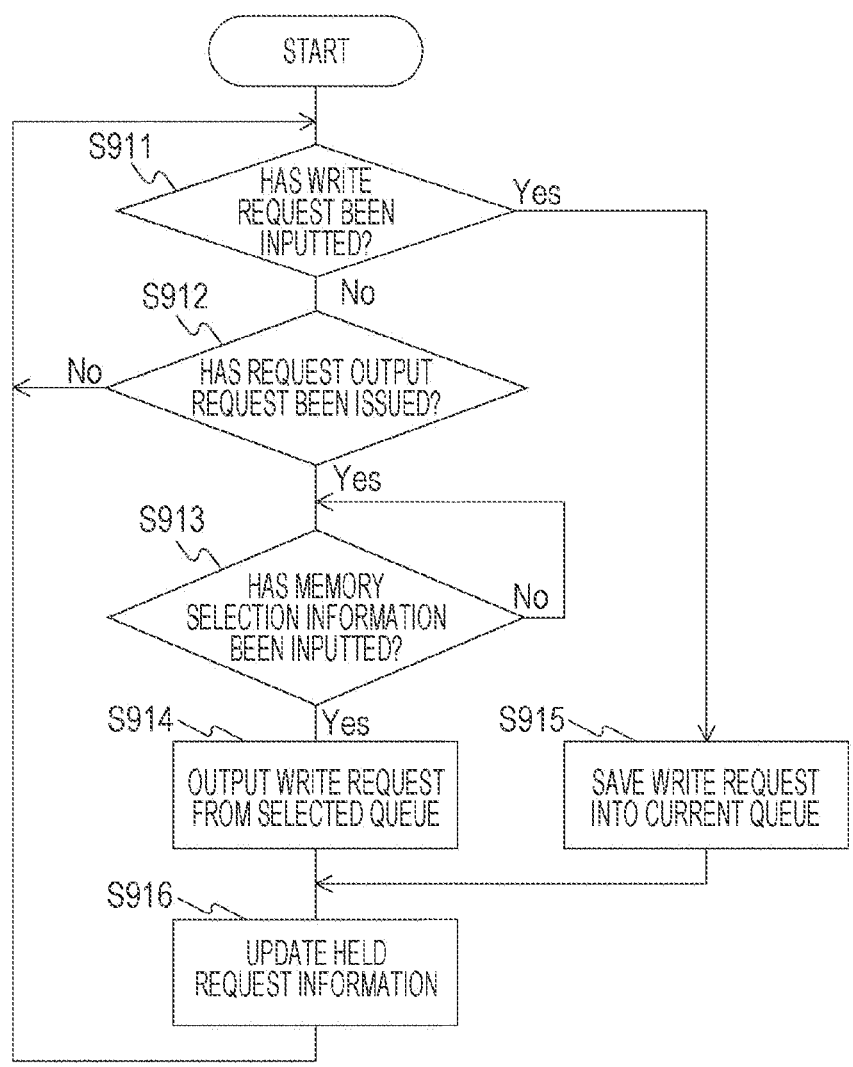
FIG. 7 is a chart showing an example of the processing procedures of a process in the write request management unit 230 according to the first embodiment of the present technology.

FIG. 7 is a chart showing an example of the processing procedures of a process in the write request management unit 230 according to the first embodiment of the present technology. First, the write request management unit 230 determines whether a write request has been inputted from the write request generation unit 210 (step S911). If a write request has been inputted (step S911: Yes), the write request management unit 230 causes the current queue of the queues #1 (233) and #2 (234) to hold the write request (step S915). After that, the write request management unit 230 moves on to the processing in step S916.

If any write request has not been inputted in step S911 (step S911: No), the write request selection unit 231 determines whether a request output request has been issued from the write request processing unit 260 (step S912). If any request output request has not been issued (step S912: No), the write request management unit 230 again performs the process starting from step S911. If a request output request has been issued (step S912: Yes), on the other hand, the write request selection unit 231 stands by until memory selection information is inputted from the memory selection information generation unit 240 (step S913: No). When memory selection information is inputted (step S913: Yes), the write request selection unit 231 selects the queue #1 (233) or #2 (234) in accordance with the memory selection information, and retrieves a write request from the selected queue. The retrieved write request is then outputted to the write request processing unit 260 (step S914). After that, the write request management unit 230 moves on to the processing in step S916.

In step S916, the queues #1 (233) and #2 (234) update the held request information (step S916). After that, the write request management unit 230 moves on to the processing in step S911.

[Process to be Performed by the Write Request Processing Unit]

Figure 8:
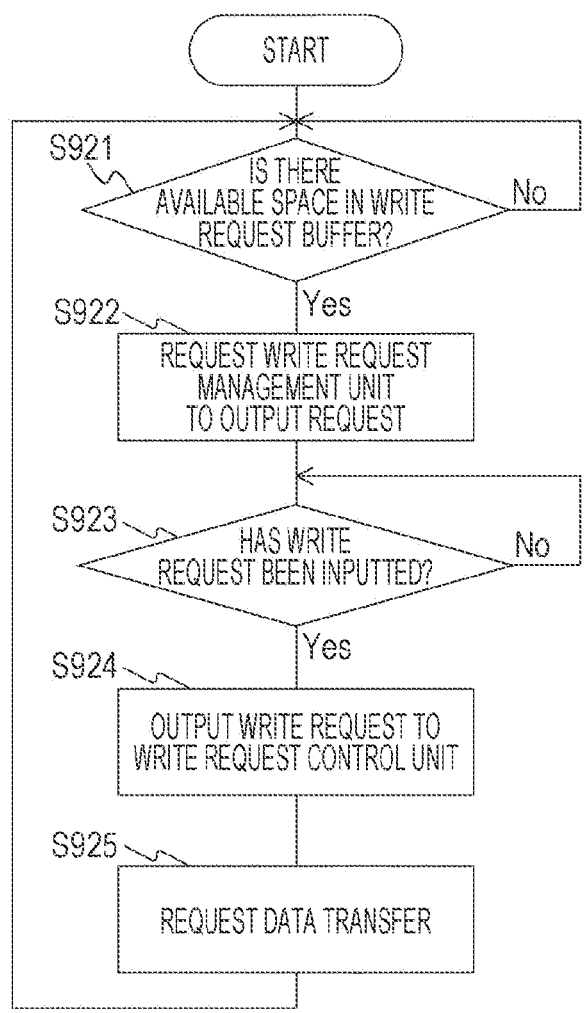
FIG. 8 is a chart showing an example of the processing procedures of a process in a write request processing unit 260 according to the first embodiment of the present technology.

FIG. 8 is a chart showing an example of the processing procedures of a process in the write request processing unit 260 according to the first embodiment of the present technology. First, the write request processing unit 260 stands by until some space becomes available in the write request buffer 282 of the write request control unit 280 (step S921: No). This determination is made in accordance with write request information outputted from the write request control unit 280. If there is available space in the write request buffer 282 (step S921: Yes), the write request processing unit 260 requests the write request management unit 230 to output a write request (step S922). In doing so, the write request processing unit 260 issues a request output request to the write request management unit 230.

After that, the write request processing unit 260 stands by until a write request is inputted (step S923: No). When a write request is input from the write request management unit 230 (step S923: Yes), the write request processing unit 260 outputs the write request to the write request control unit 280 (step S924). The write request processing unit 260 then requests the data transfer control unit 221 to transfer data (step S925). In doing so, the write request processing unit 260 issues a data transfer request to the data transfer control unit 221. After that, the write request processing unit 260 moves on to the processing in step S921.

[Process to be Performed by the Write Request Control Unit]

Figure 9:
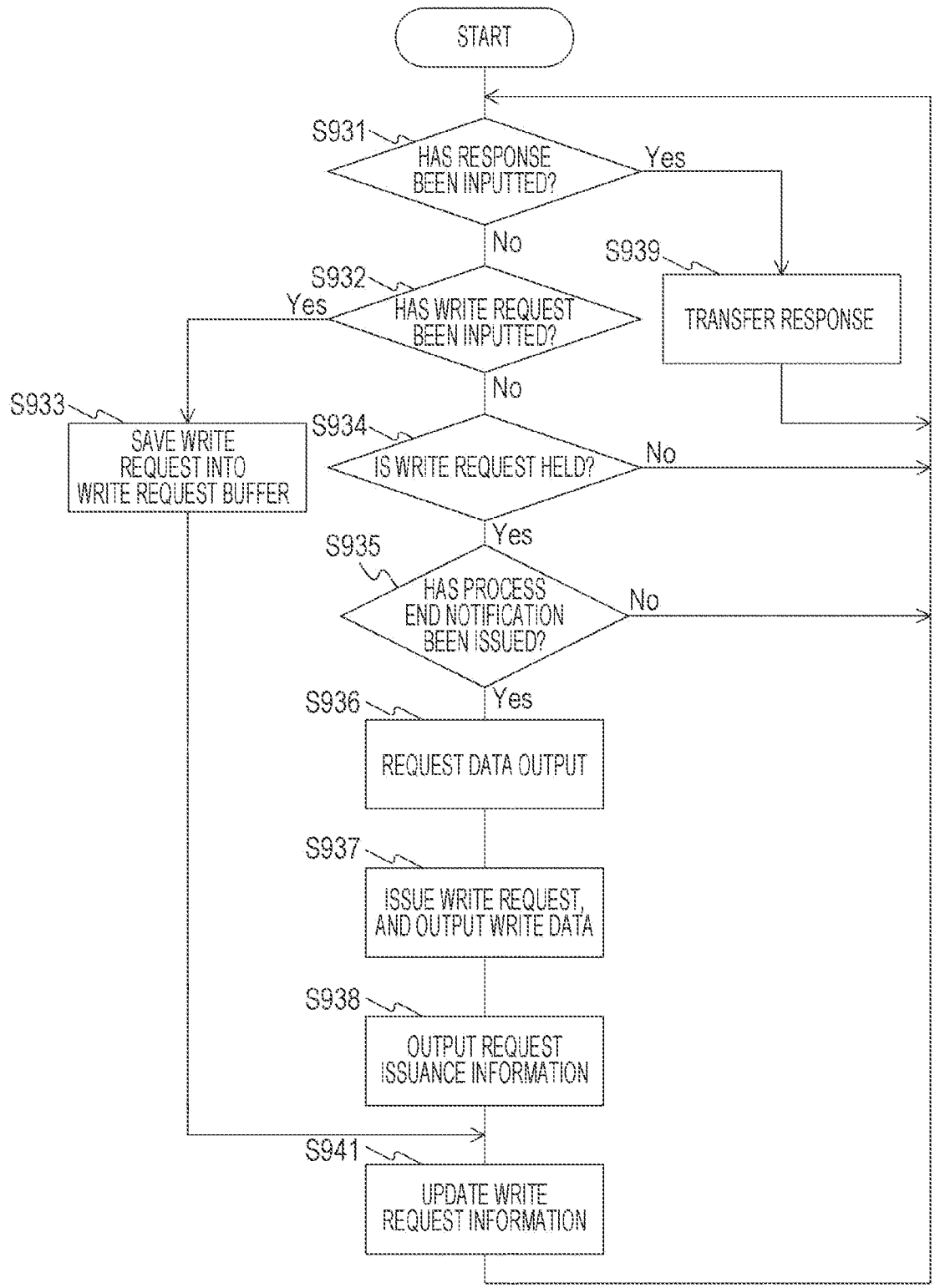
FIG. 9 is a chart showing an example of the processing procedures of a process in the write request control unit 280 according to the first embodiment of the present technology.

FIG. 9 is a chart showing an example of the processing procedures of a process in the write request control unit 280 according to the first embodiment of the present technology. First, the write request control unit 280 determines whether a response has been inputted from the memory device 300 (step S931). If a response has been inputted (step S931: Yes), the write request control unit 280 outputs the response to the memory state information holding unit 270, to transfer the response (step S939). After that, the write request control unit 280 again moves on to the processing in step S931. If any response has not been inputted (step S931: No), on the other hand, the write request control unit 280 determines whether a write request has been inputted from the write request processing unit 260 (step S932). If a write request has been inputted (step S932: Yes), the write request buffer 282 saves the inputted write request (step S933). After that, the write request control unit 280 moves on to the processing in step S941.

If any write request has not been inputted in step S932 (step S932: No), the output control unit 281 determines whether a write request is held in the write request buffer 282 (step S934). If any write request is not held (step S934: No), the output control unit 281 moves on to the processing in step S931. If a write request is held (step S934: Yes), on the other hand, the output control unit 281 moves on to the processing in step S935.

In step S935, the output control unit 281 determines whether a process end notification has been outputted from the ECC processing unit 222 (step S935). If any process end notification has not been outputted (step S935: No), the output control unit 281 moves on to the processing in step S931. If a process end notification has been outputted (step S935: Yes), on the other hand, the output control unit 281 requests the ECC processing unit 222 to output data (step S936). In doing so, the output control unit 281 issues a data output request to the ECC processing unit 222. As a result, write data is outputted from the ECC processing unit 222. The output control unit 281 issues the write request held in the write request buffer 282, and outputs the write data outputted from the ECC processing unit 222. The write request and the write data are outputted to the memory device 300 via the memory interface 202 (step S937). The output control unit 281 then outputs request issuance information to the memory state information holding unit 270 (step S938). After that, the output control unit 281 updates the write request information (step S941), and moves on to the processing in step S931.

[Write Request Process]

Figure 10:
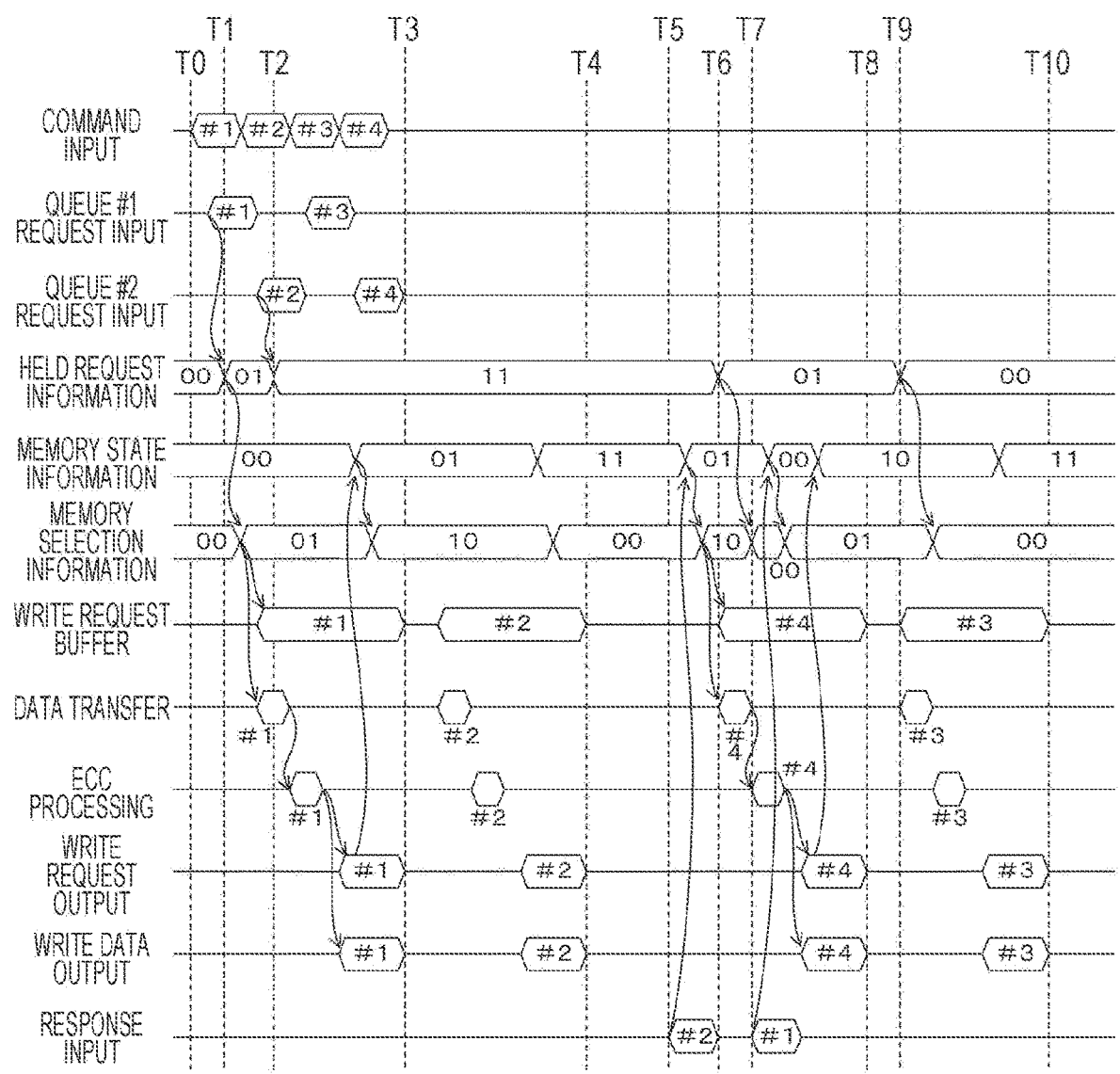
FIG. 10 is a chart showing an example of processing of write requests according to the first embodiment of the present technology.

FIG. 10 is a chart showing an example of processing of write requests according to the first embodiment of the present technology. The chart shows the state of each component in a case where a write request is processed in the memory controller 200. In the chart, the "command input" indicates write commands issued by the host computer 100. The "queue #1 request input" and the "queue #2 request input" indicate write requests inputted to the queues #1 (233) and #2 (234), respectively, of the write request management unit 230. The "held request information" is expressed in 2-bit binary notation, and the high-order bit and the low-order bit represent the held request information about the queues #2 (234) and #1 (233), respectively. Likewise, in the "memory state information", the high-order bit and the low-order bit represent the states of the memory modules #2 (320) and #1 (310), respectively. In the "memory selection information", the high-order bit and the low-order bit indicate selection as to the memory modules #2 (320) and #1 (310), respectively. Each of these pieces of information has the value "00" in the initial state.

In the chart, the "write request buffer" indicates a write request held in the write request buffer 282. The "data transfer" indicates the current write data to be subjected to a transfer process by the data transfer control unit 221. The "ECC processing" indicates the current write data to be subjected to an encoding process by the ECC processing unit 222. The "write request output" and the "write data output" indicate the write request and the write data outputted from the write request control unit 280, respectively. The write request and the write data correspond to a write request issued by the memory controller 200 and the write data associated with the write request. The "response input" indicates a response inputted from the memory device 300.

Between T0 and T3, write commands #1 through #4 are sequentially issued from the host computer 100. Of these commands, it is assumed that the commands #1 and #3 are write commands for the memory module #1 (310), and the commands #2 and #4 are write commands for the memory module #2 (320). Requests based on these commands are sequentially generated by the request generation unit 210, and are saved into the corresponding queues #1 (233) and #2 (234). As a write request is saved into the queue #1 (233), the held request information changes from the value "00" to "01" (T1). Likewise, as a write request is saved into the queue #2 (234), the held request information changes from the value "01" to "11" (T2).

As shown in the chart, in the initial state, the memory modules #1 (310) and #2 (320) are not in a busy state, and the memory state information has the value "00". In this state, as the held request information changes to the value "01" at T1, the memory selection information changes to the value "01". As a result, the write request selection unit 231 of the write request management unit 230 selects the queue #1 (233). The write request #1 held in the selected queue #1 (233) is transferred to the write request buffer 282 of the write request control unit 280 via the write request processing unit 260, and is saved therein. A data transfer process and an encoding process are sequentially executed on the write data #1 corresponding to the write request #1. After the encoding process ends, outputting of the write request #1 held in the write request buffer 282 and the write data #1 subjected to the encoding process is started. As described above, each bit of the memory selection information has the value "1", when the corresponding bit of the held request information has the value "1" while the corresponding bit of the memory state information has the value "0".

At this stage, request issuance information is outputted from the output control unit 281 of the write request control unit 280, and the memory state information changes to the value "01". This indicates that the memory module #1 (310) is in a busy state. As a result, the memory selection information changes to the value "10". It should be noted that, at T2, both the memory modules #1 (310) and #2 (320) are not in a busy state, and requests are held in both the queues #1 (233) and #2 (234). As described above, in a case where there are a plurality of selectable memory modules, the memory selection information generation unit 240 selects one of the queues #1 (233) and #2 (234), and generates the memory selection information. It should be noted that in the example shown in the chart, at T1, the memory selection information is set at the value "01", and outputting of the write request #1 from the queue #1 (233) has already been started. Thus, even in a case where the held request information changes at T2, the memory selection information can remain at the value "01".

In T3 to T4, the queue #2 (234) is selected in accordance with the memory selection information. Through a process similar to the process from T0 to T3, the write request #2 and the write data #2 are outputted. As a result, the memory state information changes to the value "11", and the memory selection information changes to the value "00".

Between T4 and T8, the memory controller 200 stands by until a response is inputted from the memory device 300. As a response #2 corresponding to the write request #2 is inputted at T5, the memory state information changes to the value "01", and the memory selection information changes to the value "10". Accordingly, the queue #2 (234) is selected. The write request #4 held in the queue #2 (234) is then transferred to the write request buffer 282, and is saved therein. As a result, the held request information changes to the value "01" (T6), and the memory selection information changes to the value "00". Also, a data transfer process and an encoding process are sequentially performed on the write data #4 corresponding to the write request #4, and the write data #4 subjected to the encoding process is outputted together with the write request #4.

At T7, on the other hand, as a response #1 corresponding to the write request #1 is inputted, the memory state information changes to the value "00", and the memory selection information changes to the value "01". After that, as outputting of the write request #4 and the write data #4 is started, the memory state information changes to the value "10".

Between T8 and T10, the write request #3 and the write data #3 are outputted in a manner similar to that between T3 and T4. The write request held in the queue #1 (233) is outputted to the memory module #1 (310), and the held request information changes to the value "00" (T9). As a result, the memory selection information changes to the value "00". Further, as the write request #3 is outputted, the memory state information changes to the value "11".

After that, as a response is inputted, the memory state information returns to the value "00" (not shown).

As described above, in a case where the response #2 to the write request #2 issued later is inputted earlier than the response #1, the write request to memory module #2 is preferentially selected and issued. This is because the memory module #2 that is not in a busy state is selected in accordance with the memory state information. That is, in a case where the times required for writing in the memory modules #1 (310) and #2 (320) differ from each other, the order of write requests based on write commands issued from the host computer 100 can be changed, and the write requests can be issued to the memory device 300 in the changed order.

Figure 11:
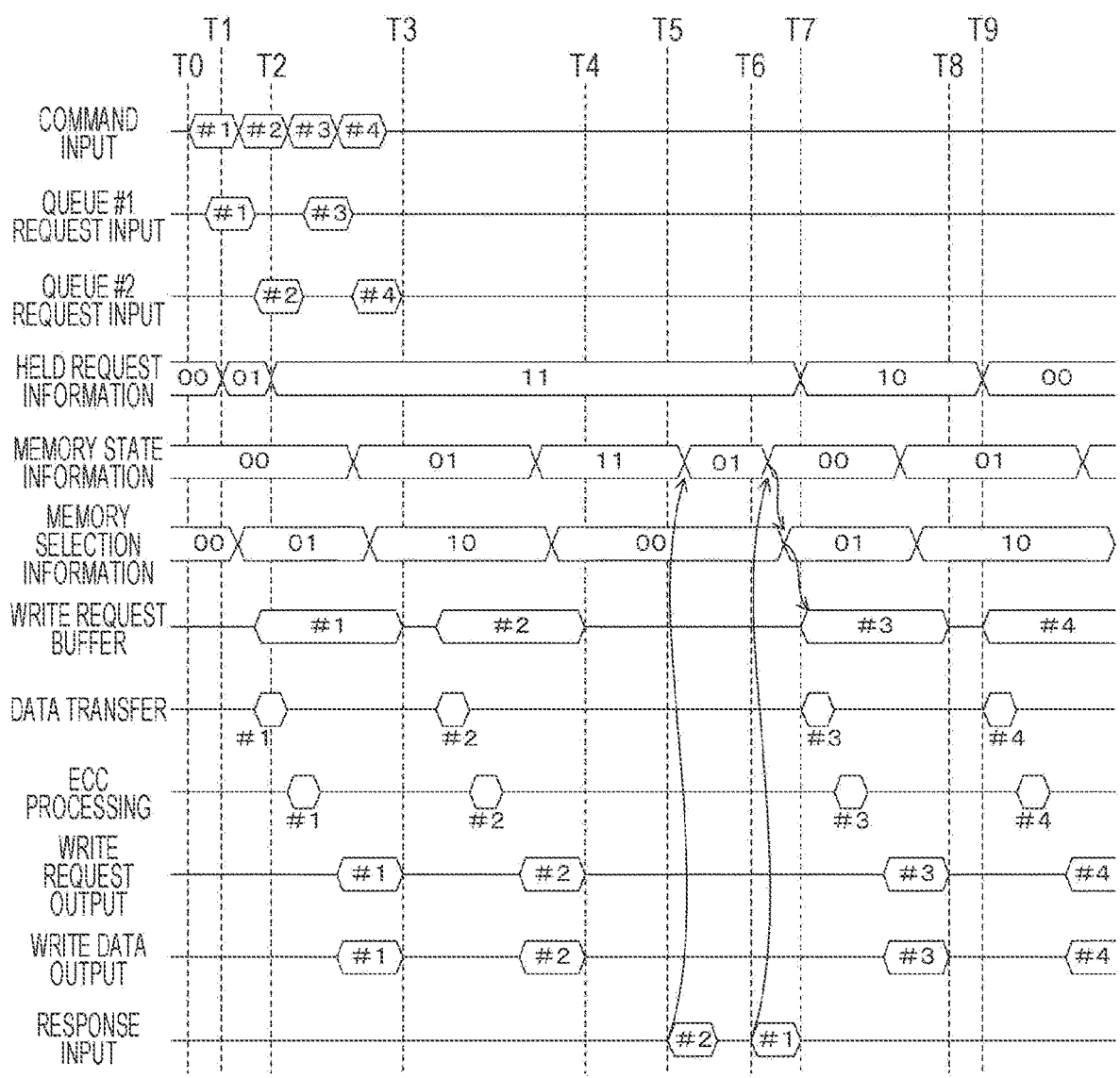
FIG. 11 is a chart showing another example of processing of write requests according to the first embodiment of the present technology.

FIG. 11 is a chart showing another example of processing of write requests according to the first embodiment of the present technology. The process shown in FIG. 11 is an example of a process for comparison with the process described with reference to FIG. 10, and is an example case where write requests are selected in accordance with the order of write commands inputted to the memory controller 200, and are then issued to the memory 300.

The processing from T0 to T4 is similar to the processing from T0 to T4 in FIG. 10, and therefore, explanation thereof is not repeated herein.

Between T4 and T8, the memory controller 200 stands by until a response is inputted from the memory device 300. At T5, as the response #2 is inputted, the memory state information changes to the value "01". However, the memory selection information does not change, and remains at the value "00". This is because the queue #2 (234) corresponding to the memory module #2 is selected at T3, and the memory selection information generation unit 240 stands by until the memory module #1 (310) to be selected next switches from a busy state to an idle state. At T6, as the response #1 is inputted, the memory state information and the memory selection information change to the values "00" and "01", respectively. Accordingly, the queue #1 (233) is selected, and the write request #3 and the write data #3 are outputted.

At T9, the queue #2 (234) is selected. After that, outputting of the write request #4 and the write data #4 is started.

As described above, by a method of selecting and issuing the corresponding write requests in the order of write commands inputted to the memory controller 200, the order of request issuance cannot be appropriately changed, resulting in a relatively long waiting time. Accordingly, a longer time is required for processing a plurality of write requests.

As described above, in the first embodiment of the present technology, a check is made to determine whether each of the plurality of memory modules is in a busy state, and the order of write request issuance is changed. Thus, it becomes possible to shorten the writing time in a storage device using memory modules that require different writing times.

2. Second Embodiment

In the first embodiment described above, a write request buffer is used. On the other hand, a second embodiment of the present technology further includes a write data buffer. With this arrangement, the write data in a memory module in a busy state is processed in advance, and the processed write data can be saved into the write data buffer. Thus, the time required for request issuance can be shortened.

[Configuration of the Memory Controller]

Figure 12:
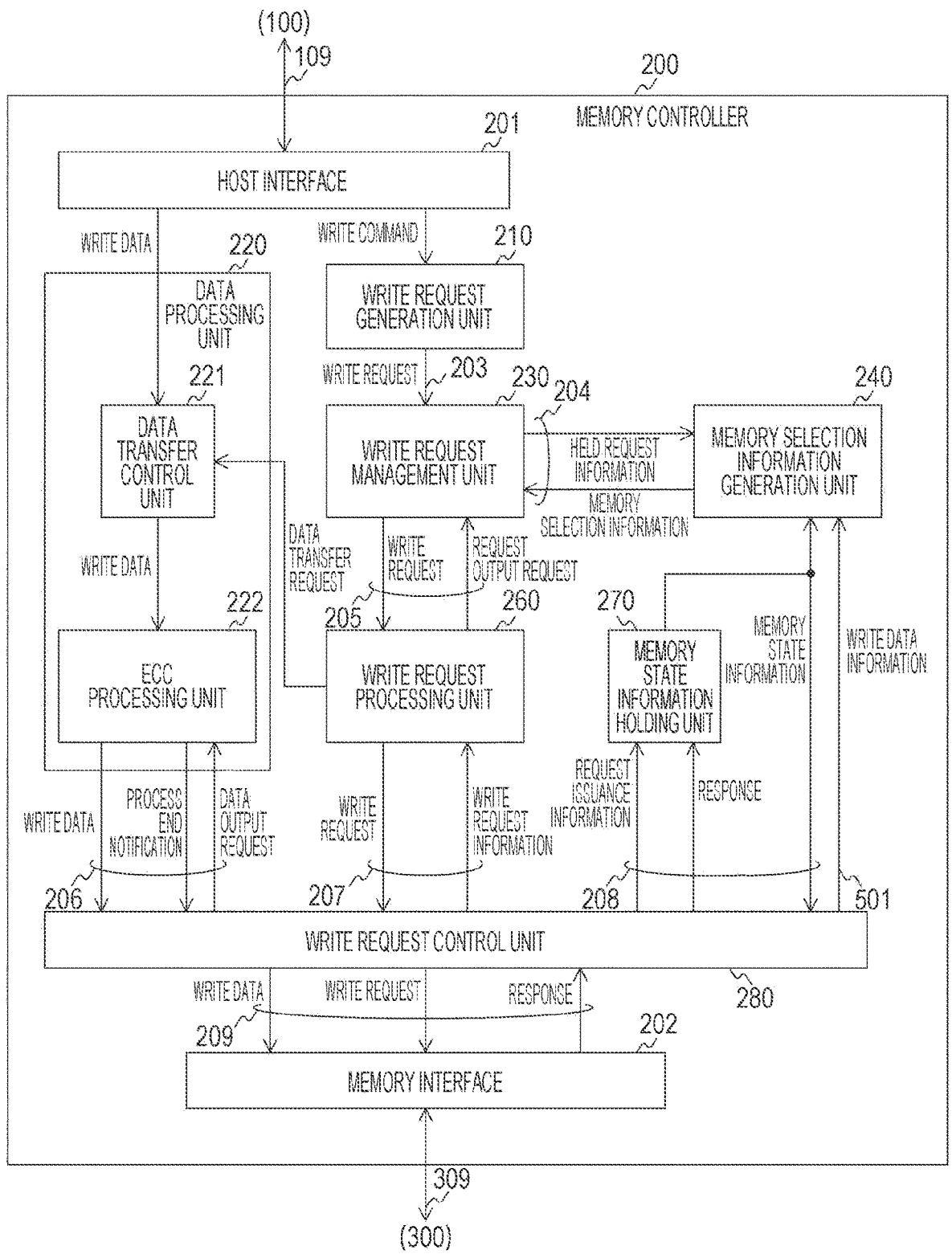
FIG. 12 is a diagram showing an example configuration of a memory controller 200 according to a second embodiment of the present technology.

FIG. 12 is a diagram showing an example configuration of a memory controller 200 according to the second embodiment of the present technology. The memory controller 200 in this drawing differs from the memory controller 200 described with reference to FIG. 3 in the following aspects. The memory state information holding unit 270 outputs memory state information to the memory selection information generation unit 240 and the write request control unit 280. Further, the write request control unit 280 outputs write data information, which will be described later, to the memory selection information generation unit 240. The memory selection information generation unit 240 selects a memory module to which a write request is to be issued, in accordance with the write data information, the memory state information, and held request information.

[Configuration of the Write Request Control Unit]

Figure 13:
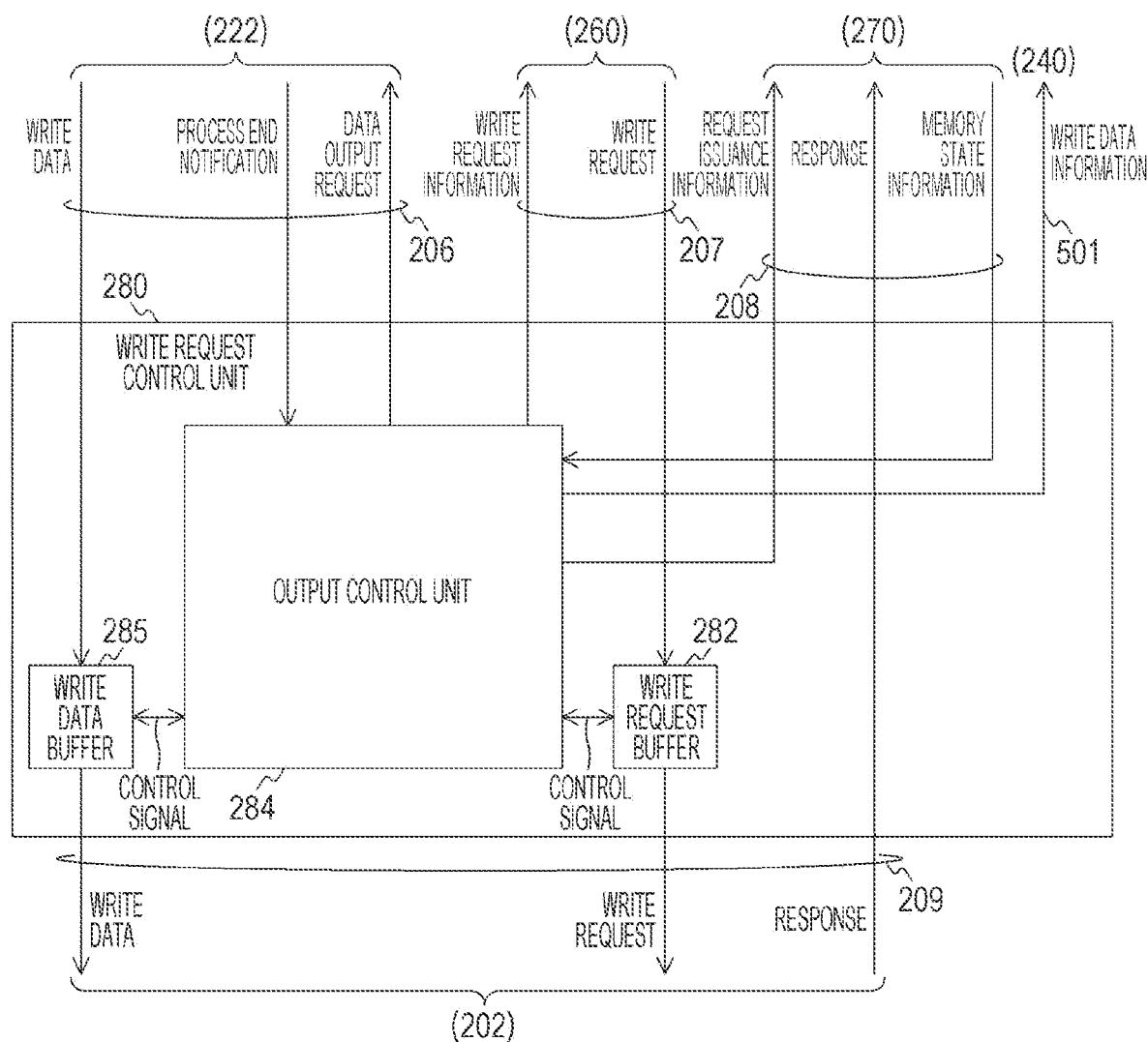
FIG. 13 is a diagram showing an example configuration of a write request control unit 280 according to the second embodiment of the present technology.

FIG. 13 is a diagram showing an example configuration of the write request control unit 280 according to the second embodiment of the present technology. The write request control unit 280 includes an output control unit 284, a write request buffer 282, and a write data buffer 285.

The write data buffer 285 is designed to hold write data subjected to an encoding process by the ECC processing unit 222. It should be noted that the write data buffer 285 is an example of the data holding unit of the claims.

The output control unit 284 controls the write data buffer 285. The output control unit 284 also generates write data information, and outputs the write data information to the memory selection information generation unit 240. Here, the write data information is the information indicating whether write data is held in the write data buffer 285. The write data information can be expressed by 1-bit information, for example. Specifically, the value "1" indicates a case where write data is held in the write data buffer 285, and the value "0" indicates a case where any write data is not held in the write data buffer 285. The output control unit 284 further determines whether the corresponding memory module is in a busy state, issues a write request, and outputs write data. This process is performed in accordance with memory state information outputted by the memory state information holding unit 270. The configuration of the output control unit 284 except for this aspect is similar to the configuration of the output control unit 281 described with reference to FIG. 5, and therefore, explanation thereof is not repeated herein.

[Memory Selection Process]

In a case where the write data information generated by the above described output control unit 284 indicates that any write data is not held in the write data buffer 285, the memory selection information generation unit 240 in FIG. 12 selects a memory module in accordance with memory state information. In this case, the memory selection information generation unit 240 can select a memory module in the following manner. First, the memory selection information generation unit 240 selects a memory module that is not in a busy state from among the memory modules in which write requests are held in the corresponding queues. In a case where such a memory module does not exist, the memory selection information generation unit 240 selects a memory module in a busy state from among the memory modules in which write requests are held in the corresponding queues. It should be noted that the selection method described with reference to FIG. 3 can be used as the selection method in a case where a plurality of selectable memory modules exist.

As described above, in a case where there are no memory modules that are not in a busy state, the memory selection information generation unit 240 in FIG. 12 selects a memory module in a busy state, and generates and outputs memory selection information. The write request corresponding to the memory module selected in accordance with the memory selection information is saved into the write request buffer 282 of the write request control unit 280 from the write request management unit 230 via the write request processing unit 260. At this stage, a data transfer request is issued from the write request processing unit 260, and a write data transfer process is performed by the data transfer control unit 221. After that, the write data is encoded by the ECC processing unit 222, and is saved into the write data buffer 285 of the write request control unit 280. When the corresponding memory module switches from a busy state to an idle state, the output control unit 284 of the write request control unit 280 causes outputting of the write request held in the write request buffer 282 or the like and the write data to the memory device 300. It should be noted that, in a case where there is a memory module that is not in a busy state, this memory module is selected, and the corresponding write request is saved into the write request buffer 282. The corresponding write data is also subjected to a data transfer process and an encoding process, and is saved into the write data buffer 285. After that, the write request and the write data are immediately outputted to the memory device 300.

In this manner, the memory controller 200 according to the second embodiment of the present technology performs a data transfer process and an encoding process beforehand on the write data to be transferred to a memory module in a busy state, and causes the write data buffer 285 to hold the write data.

[Process to be Performed by the Write Request Control Unit]

Figure 14:
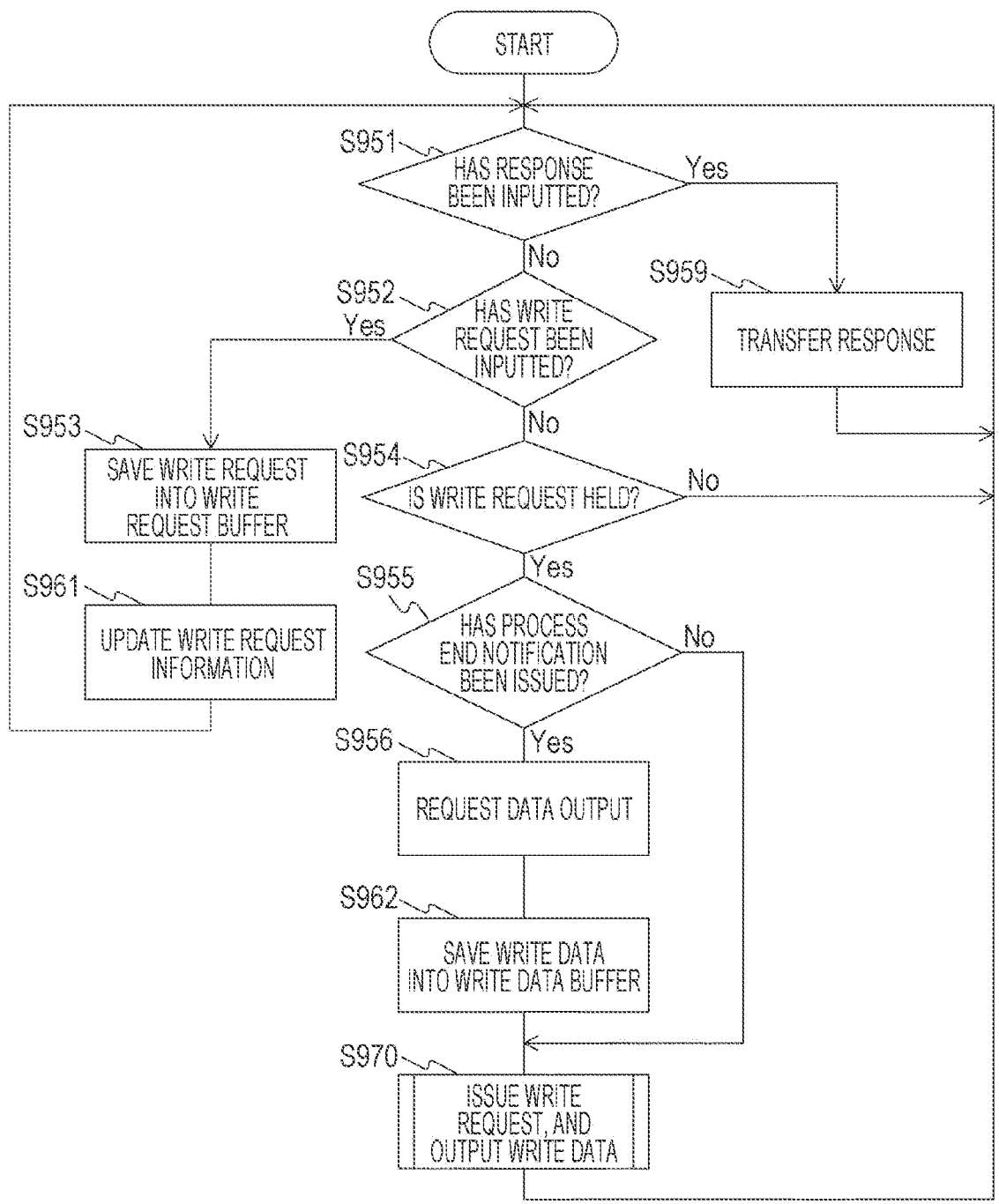
FIG. 14 is a chart showing an example of the processing procedures of a process in the write request control unit 280 according to the second embodiment of the present technology.

FIG. 14 is a chart showing an example of the processing procedures of a process in the write request control unit 280 according to the second embodiment of the present technology. First, the write request control unit 280 determines whether a response has been inputted (step S951). If a response has been inputted (step S951: Yes), the write request control unit 280 transfers the response to the memory state information holding unit 270 (step S959). After that, the write request control unit 280 again moves on to the processing in step S951. If any response has not been inputted (step S951: No), on the other hand, the write request control unit 280 determines whether a write request has been inputted from the write request processing unit 260 (step S952). If a write request has been inputted (step S952: Yes), the write request buffer 282 saves the inputted write request (step S953). The write request control unit 280 then updates the write request information (step S961), and moves on to the processing in step S951.

If any write request has not been inputted in step S952 (step S952: No), the output control unit 284 determines whether a write request is held in the write request buffer 282 (step S954). If any write request is not held (step S954: No), the output control unit 284 moves on to the processing in step S951. If a write request is held (step S954: Yes), on the other hand, the output control unit 284 determines whether a process end notification has been outputted from the ECC processing unit 222 (step S955). If a process end notification has been outputted (step S955: Yes), the output control unit 284 requests the ECC processing unit 222 to output data (step S956). The output control unit 284 then causes the write data buffer 285 to save the write data outputted from the ECC processing unit 222 (step S962). After that, the output control unit 284 moves on to the processing in step S970.

If any process end notification has not been outputted in step S955 (step S955: No), the output control unit 284 skips the processing in steps S956 and S962, and moves on to the processing in step S970. In step S970, the output control unit 284 performs a process of issuing a write request and outputting write data (step S970). As a result, the write data is saved into the write data buffer 285. If the current memory module is not in a busy state, a write request is issued, and the write data is outputted. After that, the output control unit 284 moves on to the processing in step S951.

[Write Request Issuance and Write Data Output Process]

Figure 15:
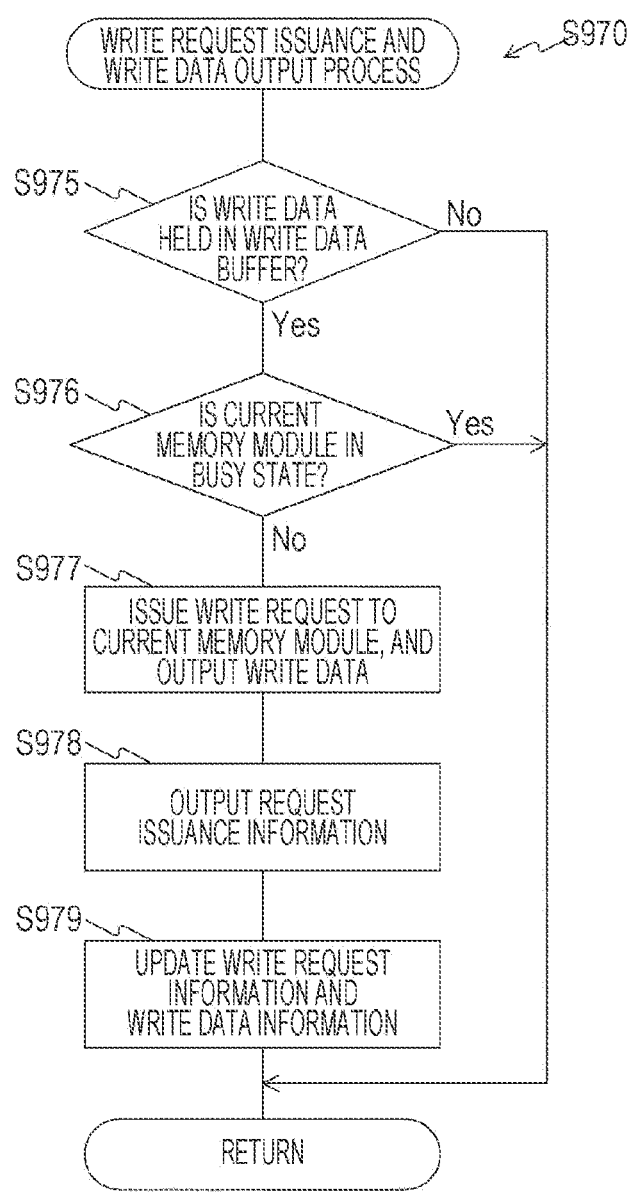
FIG. 15 is a chart showing an example of the processing procedures of a write request issuance and write data output process (step S970) according to the second embodiment of the present technology.

FIG. 15 is a chart showing an example of the processing procedures of the write request issuance and write data output process (step S970) according to the second embodiment of the present technology. First, the output control unit 284 determines whether write data is held in the write data buffer 285 (step S975). If there is no held write data (step S975: No), the output control unit 284 ends the write request issuance and write data output process.

If write data is held (step S975: Yes), the output control unit 284 determines whether the current memory module as the target of the write request is in a busy state, in accordance with the memory state information (step S976). If the current memory module is in a busy state (step S976: Yes), the output control unit 284 ends the write request issuance and write data output process. If the current memory module is not in a busy state (step S976: No), the output control unit 284 issues a write request to the current memory module, and outputs the write data. The write request and the write data are outputted to the memory device 300 via the memory interface 202 (step S977). The output control unit 284 outputs the request issuance information to the memory state information holding unit 270 (step S978), and updates the write request information and the write data information (step S979). After that, the output control unit 284 ends the write request issuance and write data output process.

The processes in the memory controller 200 other than this are similar to the processes described with reference to FIGS. 6 through 8, and therefore, explanation thereof is not repeated herein. Further, the configuration of the memory controller 200 except for this aspect is similar to the configuration of the memory controller 200 described with reference to FIG. 3, and therefore, explanation thereof is not repeated herein.

[Write Request Process]

Figure 16:
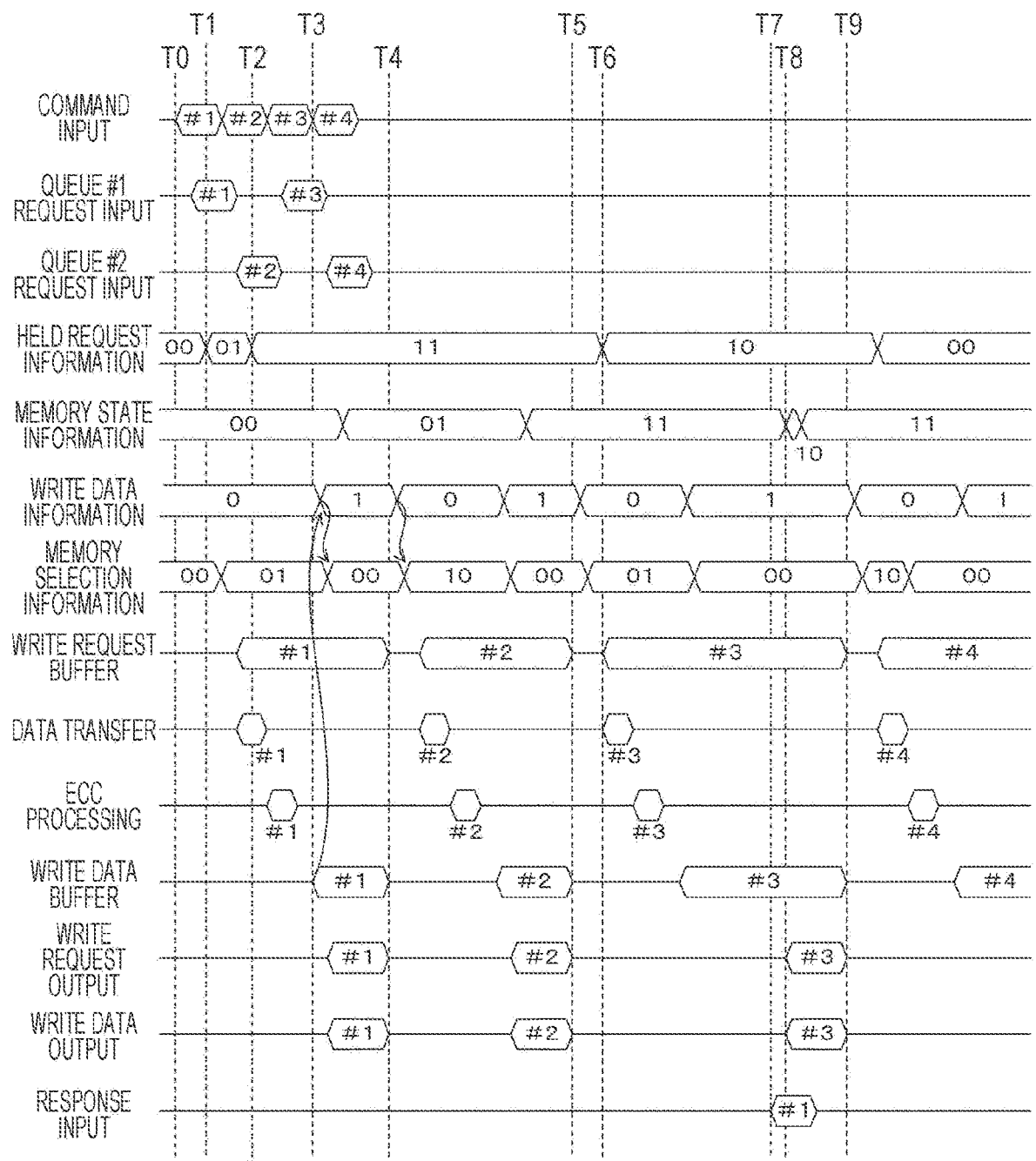
FIG. 16 is a chart showing an example of processing of write requests according to the second embodiment of the present technology.

FIG. 16 is a chart showing an example of processing of write requests according to the second embodiment of the present technology. In the chart, the "write data buffer" indicates the data held in the write data buffer 285. The chart further shows the "write data information" that indicates the state of the write data buffer 285. The initial value of the write data information is the value "0". Other than this, the same notation as in FIG. 10 is used.

The processing from T0 to T2 is similar to the processing from T0 to T2 described with reference to FIG. 10, and therefore, explanation thereof is not repeated herein.

Between T2 and T4, write data #1 subjected to an encoding process in the ECC processing unit 222 is saved into the write data buffer 285 (T3), and the write data information changes from the value "0" to the value "1". As a result, the memory selection information changes from the value "01" to the value "00". After that, a write request #1 and the write data #1 are outputted.

Between T4 and T5, the write data #1 held in the write data buffer 285 is outputted, and the write data information changes to the value "0". Further, since the held request information and the memory state information are the values "11" and "01", respectively, the memory selection information changes to the value "10". In accordance with the memory selection information, a write request #2 is transferred from a queue #2 (236) to the write request buffer 282, and is then outputted. Likewise, write data #2 subjected to a data transfer process and an encoding process is transferred to the write data buffer 285, and is then outputted. As a result, the memory state information changes to the value "11". It should be noted that the memory selection information changes to the value "00" when the write data #2 is saved into the write data buffer 285.

Between T5 and T9, both the memory modules #1 (310) and #2 (320) are in a busy state (the memory state information has the value "11"). Further, write requests are held in both the queues #1 (233) and #2 (234) (the held request information has the value "11"). In such a case, the memory selection information generation unit 240 selects one of the memory modules, as described with reference to FIG. 3. In the second embodiment of the present technology, a method of selecting memory modules in the order of memory module numbers is adopted. That is, the memory selection information generation unit 240 alternately selects the memory modules #1 (310) and #2 (320). As the memory module #2 (320) is selected between T4 and T5, the memory selection information generation unit 240 selects the memory module #1 (310), and outputs the value "01" as the memory selection information.

As a result, the write request #3 held in the queue #1 (233) is transferred to the write request buffer 282, and is saved therein (T6). Write data #3 is also subjected to a data transfer process and an encoding process, and is saved into the write data buffer 285. After that, when a response #1 is inputted at T7, the memory state information changes to the value "10", and outputting of the write request #3 and the write data #3 held in the write request buffer 282 and the write data buffer 285, respectively, is started (T8). As write data subjected to a data transfer process and an encoding process is saved into the write data buffer 285 as described above, the time from the inputting of the response #1 till the outputting of the write request #3 and the write data #3 can be shortened.

Meanwhile, the transfer of the write request #3 causes the held request information to change to the value "10" (T6). Further, when the write data #3 subjected to the encoding process is saved into the write data buffer 285, the memory selection information changes to the value "00". When the outputting of the write request #3 and the write data #3 is started (T8), the memory state information returns to the value "11".

When the outputting of the write data #3 ends at T9, the memory selection information changes to the value "10", because the held request information and the memory state information have the value "10" and the value "11", respectively. As a result, a write request #4 and write data #4 are selected and outputted.

As described above, in the second embodiment of the present technology, the preprocessing of write data in a memory module in a busy state is ended beforehand. Thus, the time required for issuing a write request after the memory module returns from the busy state to an idle state can be shortened.

3. Third Embodiment

In the above described second embodiment, a single write data buffer is used. In a third embodiment of the present technology, on the other hand, a write data buffer is provided for each memory module. With this arrangement, processing can be performed beforehand on the write data in each memory module in a busy state, and the time required for request issuance can be further shortened.

[Configuration of the Write Request Control Unit]

Figure 17:
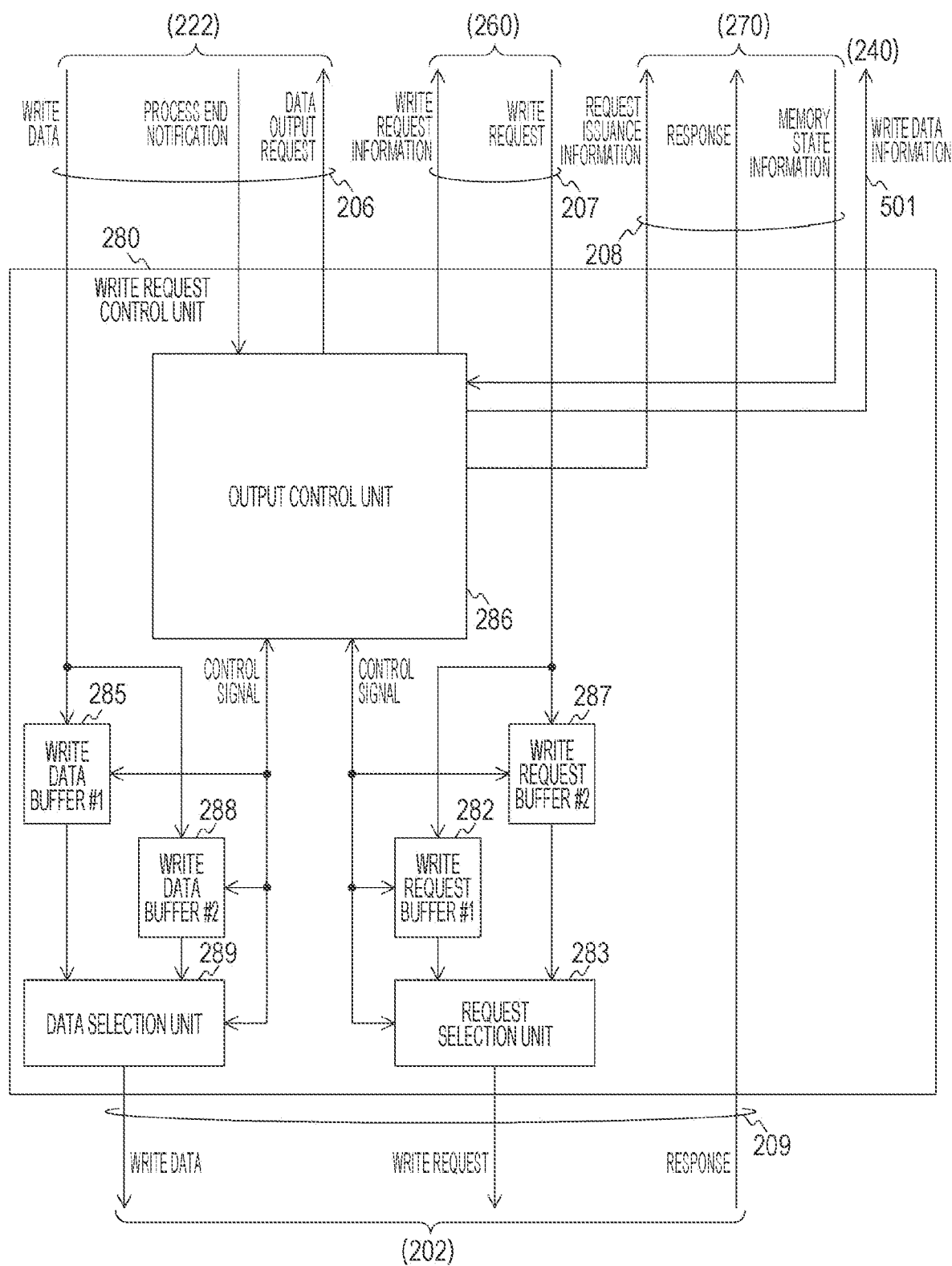
FIG. 17 is a diagram showing an example configuration of a write request control unit 280 according to a third embodiment of the present technology.

FIG. 17 is a diagram showing an example configuration of a write request control unit 280 according to the third embodiment of the present technology. This write request control unit 280 includes an output control unit 286, write request buffers #1 (282) and #2 (287), write data buffers #1 (285) and #2 (288), a request selection unit 283, and a data selection unit 289.

The write request buffers #1 (282) and #2 (287) are designed to hold write requests. The write request buffers #1 (282) and #2 (287) hold write requests in one-to-one correspondence with memory modules #1 (310) and #2 (320), respectively.

The write data buffers #1 (285) and #2 (288) are designed to hold write data. The write data buffers #1 (285) and #2 (288) hold the write data in one-to-one correspondence with the memory modules #1 (310) and #2 (320), respectively.

The request selection unit 283 selects one of the write request buffers #1 (282) and #2 (287), reads a write request, and outputs the write request. The request selection unit 283 is controlled by the output control unit 286.

The data selection unit 289 selects one of the write data buffers #1 (285) and #2 (288), reads write data, and outputs the write data. The data selection unit 289 is controlled by the output control unit 286.

The output control unit 286 causes one of the write request buffers #1 (282) and #2 (287) to hold the write request inputted from the write request processing unit 260, in accordance with the issuance destination memory module. Likewise, the output control unit 286 causes one of the write data buffers #1 (285) and #2 (288) to hold the write data, in accordance with the output destination memory module. The output control unit 286 also outputs write request information in accordance with the states of the write request buffers #1 (282) and #2 (287). Like the write request information described with reference to FIG. 5, this write request information is 1-bit information, and has the value "1" in a case where write requests are held in both the write request buffers #1 (282) and #2 (287). Meanwhile, the output control unit 286 outputs 2-bit information corresponding to the respective write data buffers #1 (285) and #2 (288) as write data information.

The configuration of the write request control unit 280 except for this aspect is similar to the configuration of the write request control unit 280 described with reference to FIG. 13, and therefore, explanation thereof is not repeated herein.

[Memory Selection Process]

The memory selection information generation unit 240 according to the third embodiment of the present technology selects a memory module in the following manner. First, the memory selection information generation unit 240 selects a memory module that is not in a busy state from among the memory modules in which write data is not held in the corresponding write data buffers but write requests held in the corresponding queues. In a case where such a memory module does not exist, the memory selection information generation unit 240 selects a memory module in a busy state from among the memory modules in which write data is not held in the corresponding write data buffers but write requests are held in the corresponding queues. It should be noted that the selection method described with reference to FIG. 3 can be used as the selection method in a case where a plurality of selectable memory modules exist.

The write request outputted from the queue #1 (233) or the like corresponding to the selected memory module is inputted to the write request control unit 280 via the write request processing unit 260. The inputted write request is saved into the corresponding write request buffer #1 (282) or #2 (287). At this point, a data transfer request is issued from the write request processing unit 260, and a write data transfer process is performed by the data transfer control unit 221. After that, write data subjected to an encoding process by the ECC processing unit 222 is saved into the corresponding write data buffer #1 (285) or #2 (288) of the write request control unit 280. The saved write request and write data are outputted to the memory device 300 via the memory interface 202 when the corresponding memory module switches from the busy state to an idle state.

[Write Request Issuance and Data Output Process]

Figure 18:
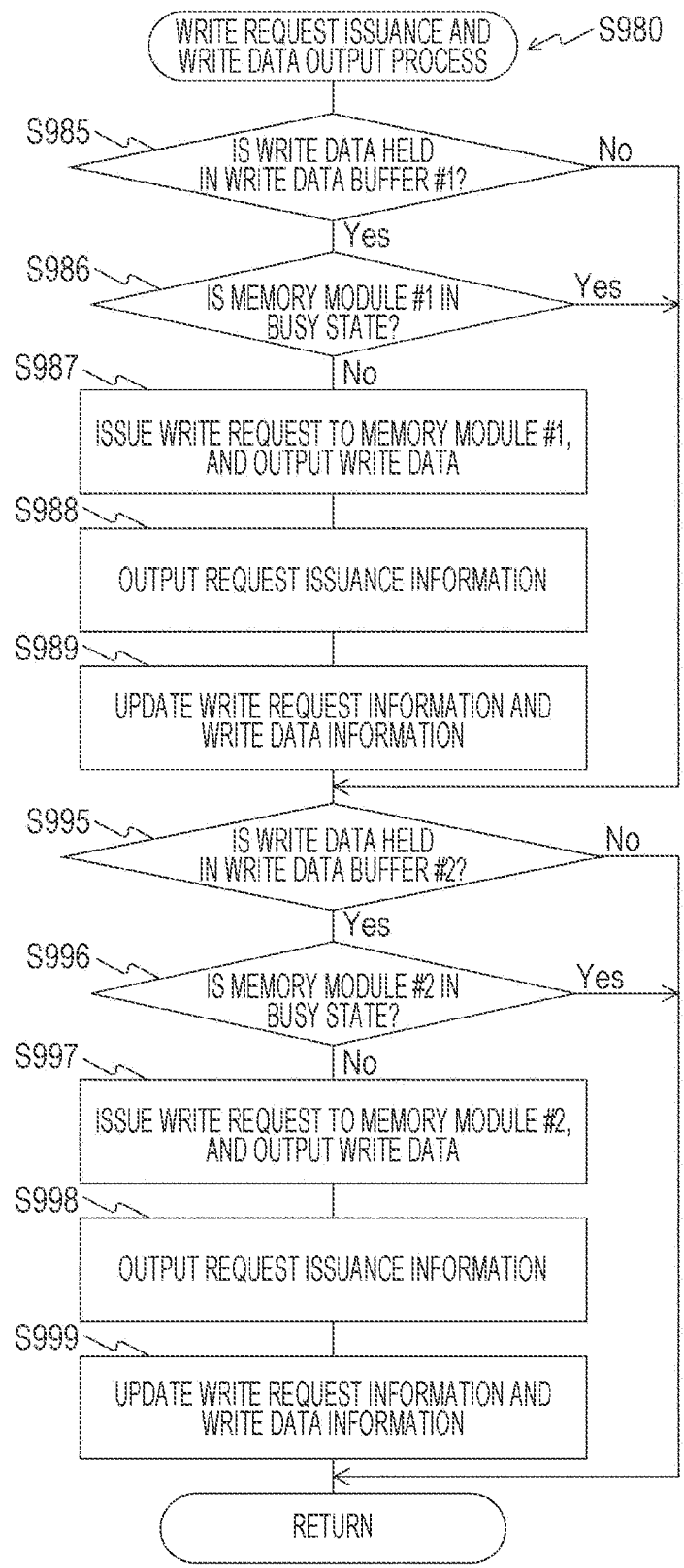
FIG. 18 is a chart showing an example of the processing procedures of a write request issuance and write data output process (step S980) according to the third embodiment of the present technology.

FIG. 18 is a chart showing an example of the processing procedures of a write request issuance and write data output process (step S980) according to the third embodiment of the present technology. The process shown in this chart is a process to be performed in place of the write request issuance and write data output process (step S970) described with reference to FIG. 14. First, the output control unit 286 determines whether write data is held in the write data buffer #1 (285) (step S985). If any write data is not held (step S985: No), the output control unit 286 moves on to the processing in step S995.

If there is held write data (step S985: Yes), the output control unit 286 determines whether the memory module #1 (310) is in a busy state (step S986). If the memory module #1 (310) is in a busy state (step S986: Yes), the output control unit 286 moves on to the processing in step S995. If the memory module #1 (310) is not in a busy state (step S986: No), the output control unit 286 issues a write request to the memory module #1 (310), and outputs write data (step S987). The output control unit 286 then outputs request issuance information (step S988), updates write request information and write data information (step S989), and moves on to the processing in step S995.

In step S995, the output control unit 286 determines whether write data is held in the write data buffer #2 (288) (step S995). If there is no held write data (step S995: No), the output control unit 286 ends the write request issuance and write data output process.

If there is held write data (step S995: Yes), the output control unit 286 determines whether the memory module #2 (320) is in a busy state (step S996). If the memory module #2 (320) is in a busy state (step S996: Yes), the output control unit 286 ends the write request issuance and write data output process. If the memory module #2 (320) is not in a busy state (step S996: No), the output control unit 286 issues a write request to the memory module #2 (320), and outputs write data (step S997). The output control unit 286 then outputs the request issuance information (step S998), updates the write request information and the write data information (step S999), and ends the write request issuance and write data output process.

The processes in the memory controller 200 other than this are similar to the processes described with reference to FIGS. 6 through 8 and FIG. 14, and therefore, explanation thereof is not repeated herein. Further, the configuration of the memory controller 200 except for this aspect is similar to the configuration of the memory controller 200 described with reference to FIG. 12, and therefore, explanation thereof is not repeated herein.

[Write Request Process]

Figure 19:
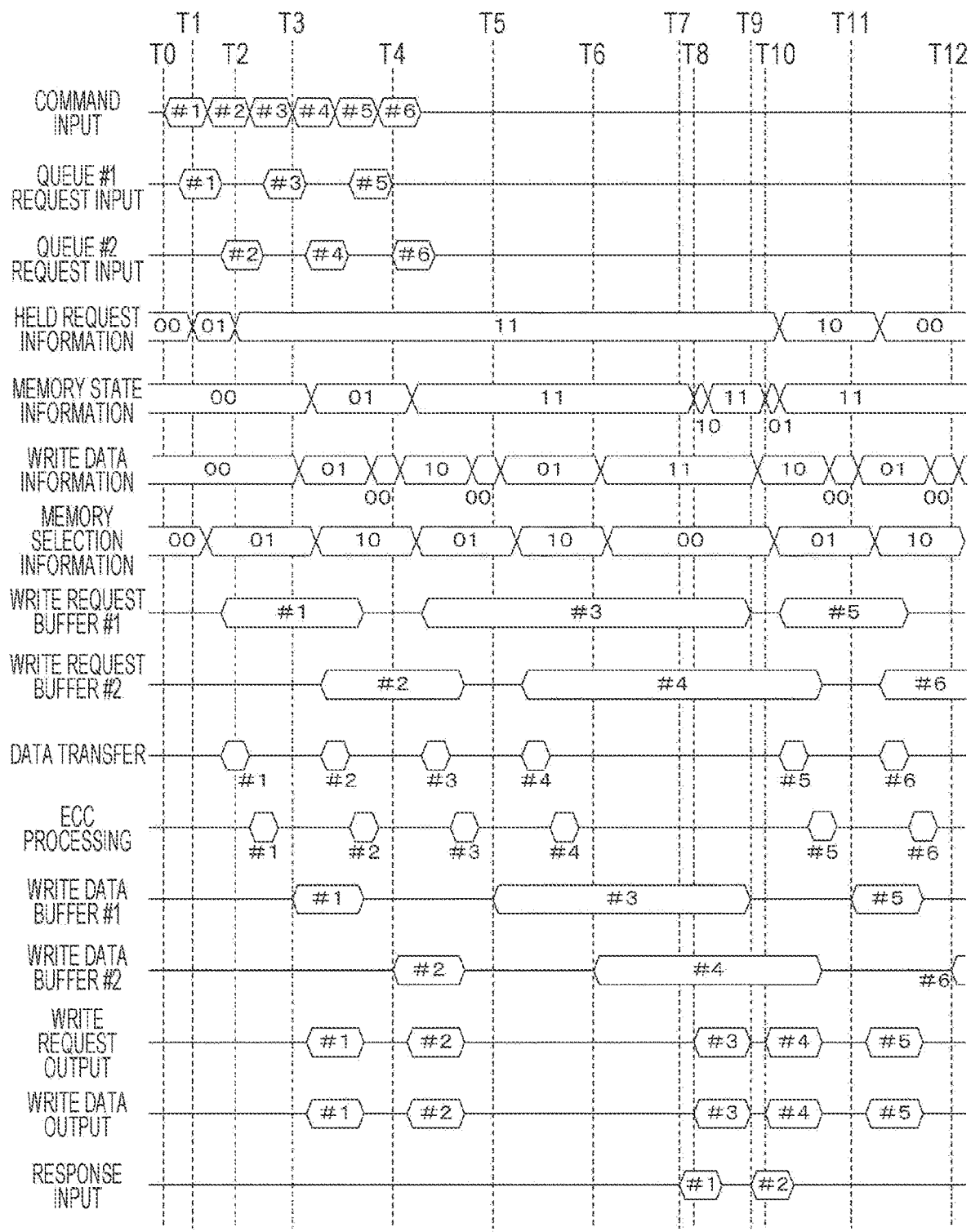
FIG. 19 is a chart showing an example of processing of write requests according to the third embodiment of the present technology.

FIG. 19 is a chart showing an example of processing of write requests according to the third embodiment of the present technology. In the drawing, the "write request buffers #1 and #2" indicate the write requests held in the write request buffers #1 (282) and #2 (287), respectively. The "write data buffers #1 and #2" indicate the write data held in the write data buffers #1 (285) and #2 (288), respectively. Further, the write data information is expressed in 2-bit binary notation, and the high-order bit and the low-order bit represent the write data information about the write data buffers #2 (288) and #1 (285), respectively. Other than this, the same notation as in FIG. 10 is used. In addition, in the drawing, write commands #1 through #6 are sequentially issued from the host computer 100. It is assumed that the commands #1, #3, and #5 are write commands for the memory module #1 (310), and the commands #2, #4, and #6 are write commands for the memory module #2 (320). Requests based on these commands are sequentially generated by the request generation unit 210, and are saved into the corresponding queues #1 (233) and #2 (234).

Between T0 and T2, as a write request is inputted to the queue #1 (233), the memory selection information changes to the value "01", and a write request #1 is outputted from the queue #1 (233) and is saved into the write request buffer #1 (282).

Between T2 and T4, write data #1 subjected to a data transfer process and an encoding process is saved into the write data buffer #1 (285) (T3), and the write data information changes to the value "01". On the other hand, as a write request is inputted to the queue #2 (234), the held request information changes to the value "11" (T2). With this, the memory selection information changes to the value "10", a write request #2 is outputted from the queue #2 (234) and is saved into the write request buffer #2 (287), and a data transfer process and an encoding process are performed on write data #2. Meanwhile, the write request #1 and the write data #1 held in the write request buffer #1 (282) and the write data buffer #1 (285), respectively, are outputted, and the write data information changes to the value "00".

Between T4 and T5, the write data #2 subjected to the data transfer process and the encoding process is saved into the write data buffer #2 (288) (T4). Further, since the outputting of the write data #1 held in the write data buffer #1 (285) has been completed, the write data information changes to the value "10", and the memory selection information changes to the value "01". As a result, a write request #3 is outputted from the queue #1 (233) and is saved into the write request buffer #1 (282), and a data transfer process and an encoding process are performed on write data #3. Meanwhile, the write request #2 and the write data #2 held in the write request buffer #2 (287) and the write data buffer #2 (288), respectively, are outputted, and the write data information changes to the value "00".

Between T5 and T11, the write data #3 subjected to the data transfer process and the encoding process is saved into the write data buffer #1 (285) (T5). Further, since the outputting of the write data #2 held in the write data buffer #2 (288) has been completed, the write data information changes to the value "01", and the memory selection information changes to the value "10". As a result, a write request #4 is outputted from the queue #2 (234) and is saved into the write request buffer #2 (287), and a data transfer process and an encoding process are performed on write data #4. After that, the write data #4 subjected to these processes is saved into the write data buffer #2 (288) (T6). As write data is held in both the write data buffers #1 (285) and #2 (288), the write data information changes to the value "11" and the memory selection information changes to the value "00".

When a response #1 is inputted at T7, outputting of the write request #3 and the write data #3 held in the write request buffer #1 (282) and the write data buffer #1 (285), respectively, is started (T8). Likewise, when a response #2 is inputted at T9, outputting of the write request #4 and the write data #4 held in the write request buffer #2 (287) and the write data buffer #2 (288), respectively, is started (T10). As the write data #3 is outputted from the write data buffer #1 (285), the write data information changes to the value "10" and the memory selection information changes to the value "01". As a result, a write request #5 is outputted from the queue #1 (233) and is saved into the write request buffer #1 (282), and a data transfer process and an encoding process are performed on write data #5. Meanwhile, the write request #4 and the write data #4 held in the write request buffer #2 (287) and the write data buffer #2 (288), respectively, are outputted, and the write data information changes to the value "00".

Between T11 and T12, the write data #5 subjected to the data transfer process and the encoding process is saved into the write data buffer #1 (285) (T11). Further, since the outputting of the write data #4 held in the write data buffer #2 (288) has been completed, the write data information changes to the value "01", and the memory selection information changes to the value "10". As a result, a write request #6 is outputted from the queue #2 (234) and is saved into the write request buffer #2 (287), and a data transfer process and an encoding process are performed on write data #6. Meanwhile, the write request #5 and the write data #5 held in the write request buffer #1 (282) and the write data buffer #1 (285), respectively, are outputted, and the write data information changes to the value "00".

As described above, the memory controller 200 according to the third embodiment of the present technology has write data buffers provided for the respective memory modules #1 (310) and #2 (320), and write data subjected to an encoding process and the like is held therein. With this arrangement, the time from the inputting of a response till the issuance of a write request and the outputting of write data can be made shorter than that with the memory controller 200 described with reference to FIG. 12.

As described above, in the third embodiment of the present technology, a write data buffer is provided for each memory module, and the preprocessing of write data in a memory module in a busy state is completed in advance. Thus, the time required for issuing a write request after the memory module returns to an idle state can be further shortened.

4. Fourth Embodiment

In the above described embodiments, a request is generated from a command issued by the host computer 100, and is then saved into a queue. In a fourth embodiment of the present technology, on the other hand, commands are held in queues. With this arrangement, commands can be saved into queues, without requests being generated from the commands. Thus, high speed saving into the queues can be performed.

[Configuration of the Memory Controller]

Figure 20:
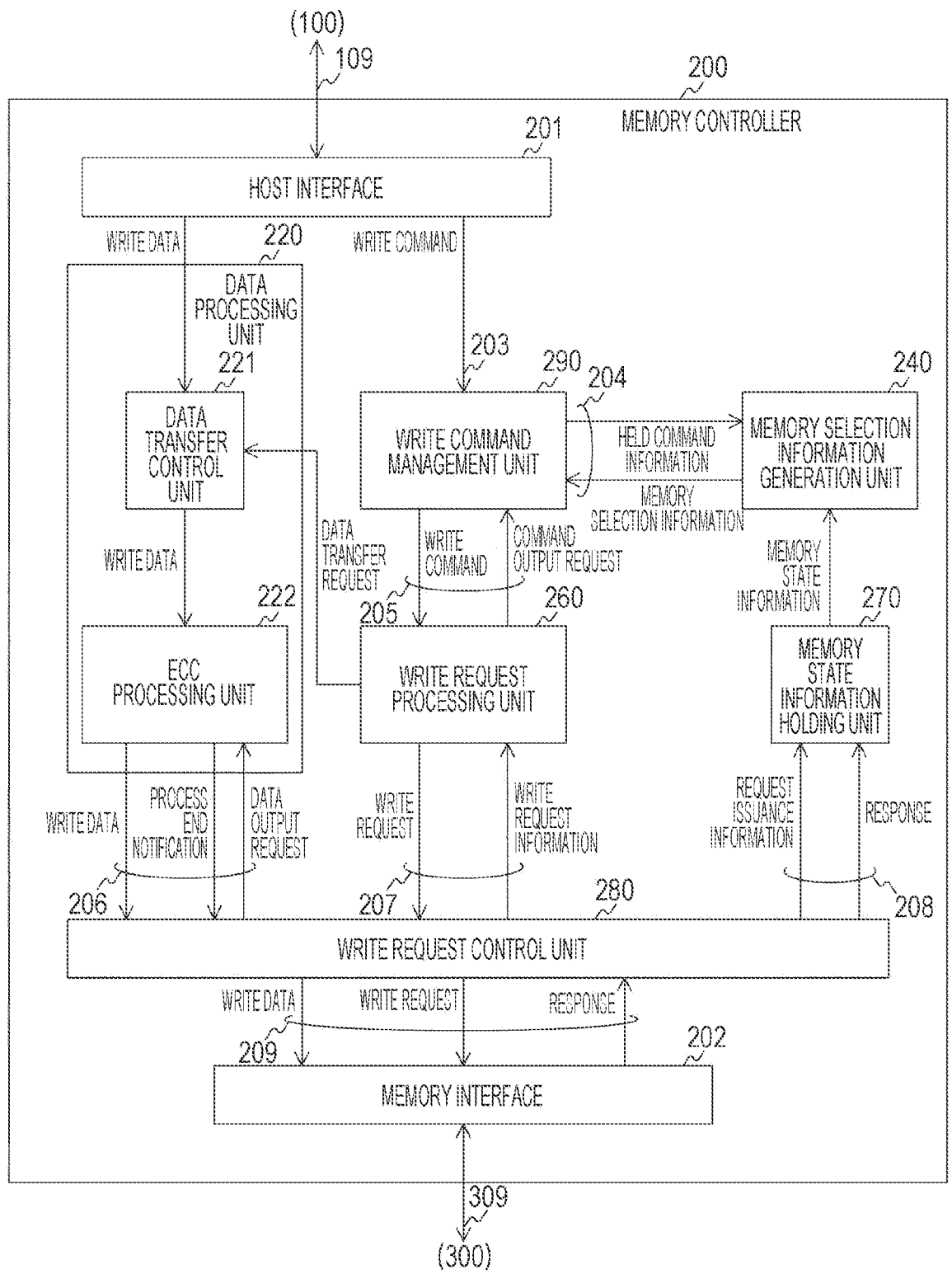
FIG. 20 is a diagram showing an example configuration of a memory controller 200 according to a fourth embodiment of the present technology.

FIG. 20 is a diagram showing an example configuration of a memory controller 200 according to the fourth embodiment of the present technology. Unlike the memory controller 200 described with reference to FIG. 3, the memory controller 200 in this drawing does not need to include the write request generation unit 210. Further, the memory controller 200 includes a write command management unit 290 in place of the write request management unit 230.

The write command management unit 290 manages write commands. The write command management unit 290 holds and selects a write command, instead of a write request, and outputs the write command to the write request processing unit 260. The write command management unit 290 also outputs held command information, instead of held request information. In these aspects, the write command management unit 290 differs from the write request management unit 230 described with reference to FIG. 3. The configuration of the write command management unit 290 except for these aspects is similar to the configuration of the write request management unit 230 described with reference to FIG. 3, and therefore, explanation thereof is not repeated herein. It should be noted that a write command is an example of the write request of the claims.

The write request processing unit 260 issues a command output request, instead of a request output request, to the write command management unit 290. The write request processing unit 260 also generates a write request in accordance with a write command outputted from the write command management unit 290, and outputs the write request to the write request control unit 280. The configuration of the write request processing unit 260 except for this aspect is similar to the configuration of the write request processing unit 260 described with reference to FIG. 3, and therefore, explanation thereof is not repeated herein.

As described above, the write request processing unit 260 in the drawing performs a process of generating a write request in accordance with a write command. This process can be performed in parallel with a data transfer process in the data transfer control unit 221. Further, since a write command issued from the host computer is saved into a queue of the write command management unit 290, the process of generating a write request in the write request generation unit 210 described with reference to FIG. 3 can be eliminated. Thus, a write command can be saved into a queue at high speed.

The configuration of the memory controller 200 except for this aspect is similar to the configuration of the memory controller 200 described with reference to FIG. 3, and therefore, explanation thereof is not repeated herein.

As described above, according to the fourth embodiment of the present technology, a write command can be saved into a queue at high speed, and the speed of a write process in the memory controller 200 can be increased.

5. Fifth Embodiment

In the above described embodiments, the memory controller 200 selects the write request to be issued to the memory 300, and then performs a process of transferring the write data corresponding to the request from the host computer 100. In a fifth embodiment of the present technology, on the other hand, write data is outputted together with a write command from the host computer 100, and the memory controller 200 saves the write data and the write command into a queue. With this arrangement, the write data transfer process after write request selection can be eliminated, and the speed of write request processing in the memory controller 200 can be increased.

[Configuration of the Memory Controller]

Figure 21:
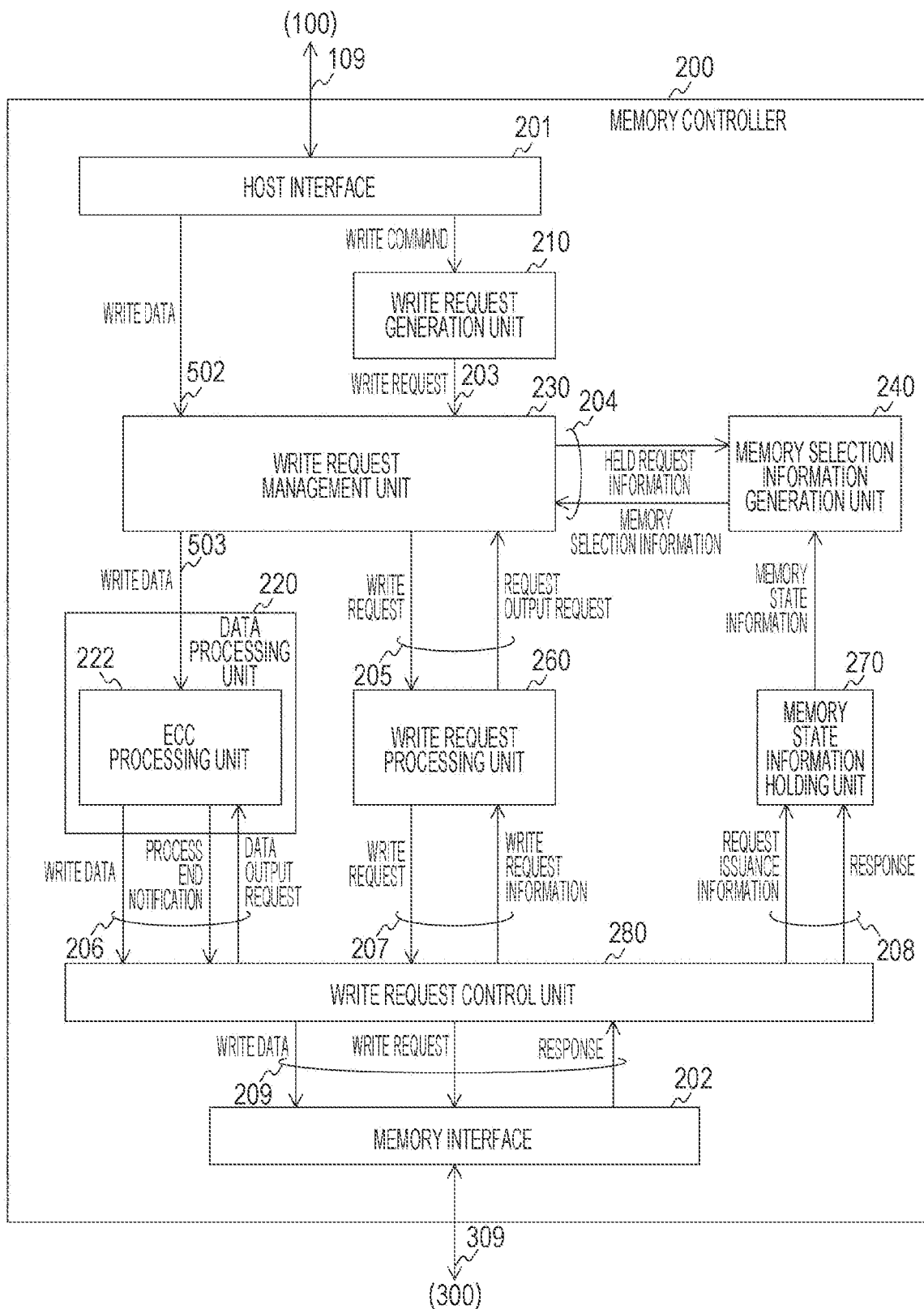
FIG. 21 is a diagram showing an example configuration of a memory controller 200 according to a fifth embodiment of the present technology.

FIG. 21 is a diagram showing an example configuration of a memory controller 200 according to the fifth embodiment of the present technology. Unlike the memory controller 200 described with reference to FIG. 3, the memory controller 200 in this drawing does not need to include the data transfer control unit 221. Further, write data is outputted from the host interface 201 to the ECC processing unit 222 of the data processing unit 220 via the write request management unit 230.

[Configuration of the Write Request Management Unit]

Figure 22:
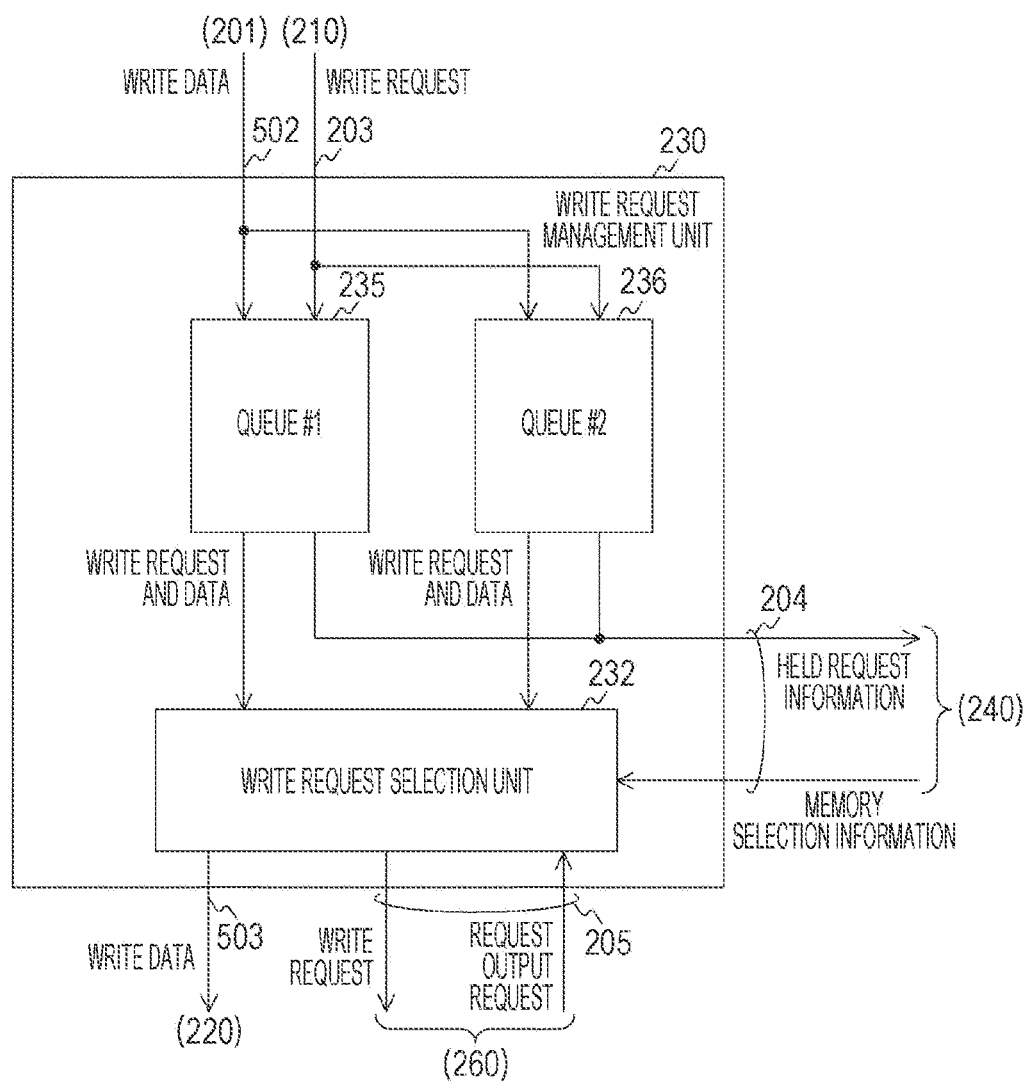
FIG. 22 is a diagram showing an example configuration of a write request management unit 230 according to the fifth embodiment of the present technology.

FIG. 22 is a diagram showing an example configuration of the write request management unit 230 according to the fifth embodiment of the present technology. The write request management unit 230 includes a queue #1 (235) and a queue #2 (236), and a write request selection unit 232.

The queue #1 (235) and the queue #2 (236) are designed to hold write requests and write data.

The write request selection unit 232 selects a write request and write data. When a request output request is issued from the write request processing unit 260, the write request selection unit 232 outputs a write request to the write request processing unit 260, and outputs write data to the ECC processing unit 222 of the data processing unit 220.

As described above, the write request management unit 230 in the drawing saves a write request and write data into the queue #1 (235) or the like, the host computer 100 needs to output the write data together with a write command to the memory controller 200.

The configuration of the memory controller 200 except for this aspect is similar to the configuration of the memory controller 200 described with reference to FIG. 3, and therefore, explanation thereof is not repeated herein.

As described above, according to the fifth embodiment of the present technology, write data is saved together with a write request into a queue. Thus, the write data transfer process after write request selection can be eliminated, and write request processing can be performed at high speed.

6. Sixth Embodiment

In the above described first embodiment, the memory selection information generation unit 240 generates memory selection information in accordance with held request information and memory state information. In addition, in accordance with the generated memory selection information, the write request selection unit 231 selects the queue #1 (233) or the like. In a sixth embodiment of the present technology, on the other hand, the write request selection unit 231 selects the queue #1 (233) or the like in accordance with memory state information. Thus, the processing in the memory controller 200 can be simplified.

Figure 23:
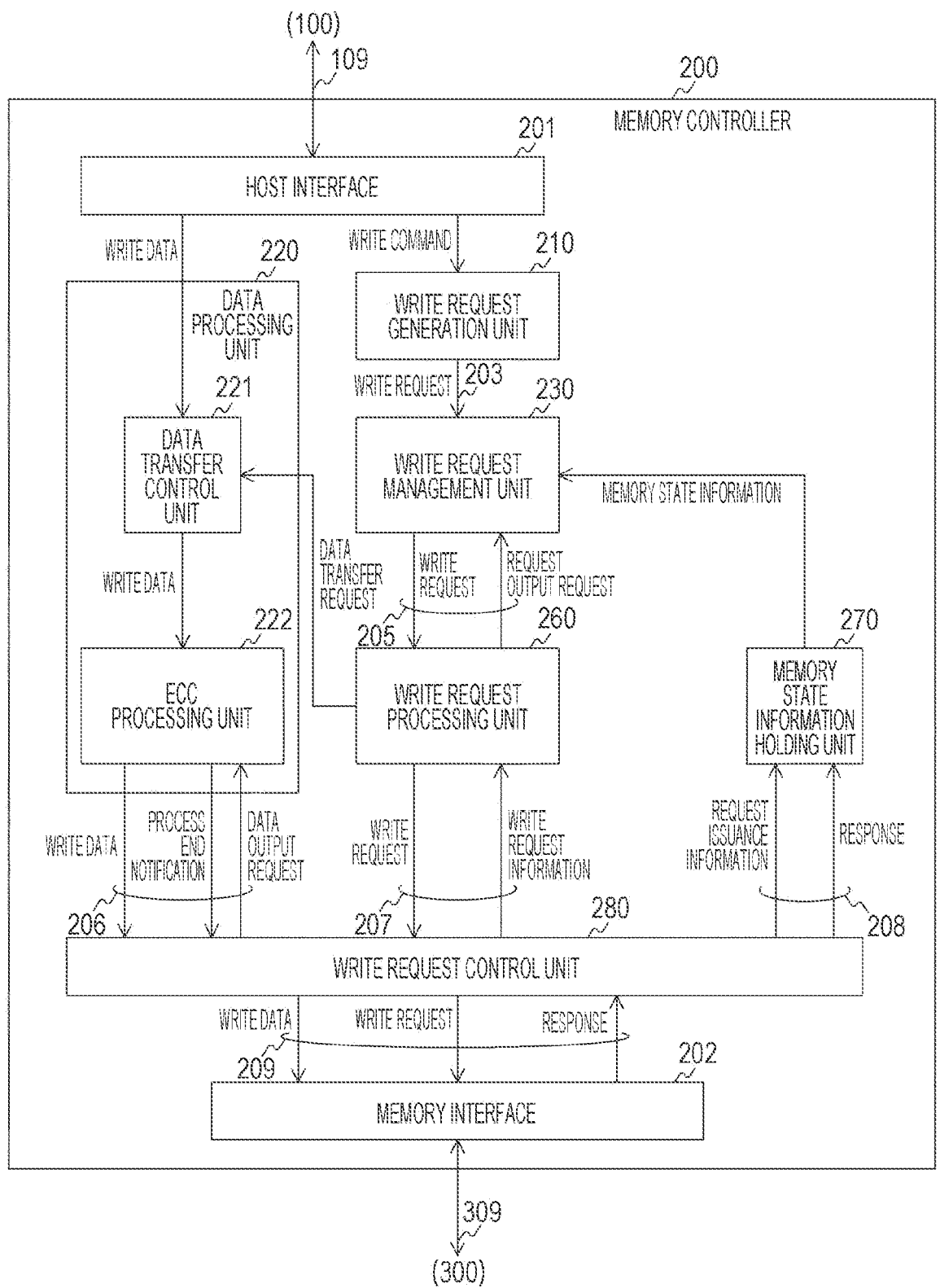
FIG. 23 is a diagram showing an example configuration of a memory controller 200 according to a sixth embodiment of the present technology.

FIG. 23 is a diagram showing an example configuration of a memory controller 200 according to the sixth embodiment of the present technology. Unlike the memory controller 200 described with reference to FIG. 3, the memory controller 200 in this drawing does not need to include the memory selection information generation unit 240. Further, the write request management unit 230 in the drawing selects a write request in accordance with memory state information outputted from the memory state information holding unit 270, and outputs the write request to the write request processing unit 260.

The write request selection unit 231 included in the write request management unit 230 in the drawing selects the queue #1 (233) or #2 (234) in accordance with the memory state information, and causes outputting of the write request. Specifically, the queue #1 (233) or #2 (234) corresponding to the memory modules #1 (310) or #2 (320), whichever is not in a busy state, is selected. In a case where a write request is held in the selected queue #1 (233) or the like, this write request is to be outputted from the queue #1 (233) or the like. The write request selection unit 231 outputs the outputted write request to the write request processing unit 260. In a case where any write request is not to be outputted from the selected queue #1 (233) or the like, on the other hand, the write request selection unit 231 can determine that any write request is not held in the queue #1 (233) or the like.

The configuration of the memory controller 200 except for this aspect is similar to the configuration of the memory controller 200 described with reference to FIG. 3, and therefore, explanation thereof is not repeated herein.

As described above, the write request selection unit 231 selects the queue #1 (233) or the like in accordance only with memory state information. Thus, the memory selection information generation unit 240 can be eliminated, and the processing in the memory controller 200 can be simplified.

<Modifications>

In the above embodiments, the memory device 300 formed with a plurality of memory chips is used. However, a memory device 300 formed with a single semiconductor chip having a plurality of memory banks may be used. This is because, in a case where the plurality of memory banks can be accessed independently of one another, the order of write request issuance can be changed in accordance with the busy states of the plurality of memory banks, and the write time can be shortened.

Figure 24:
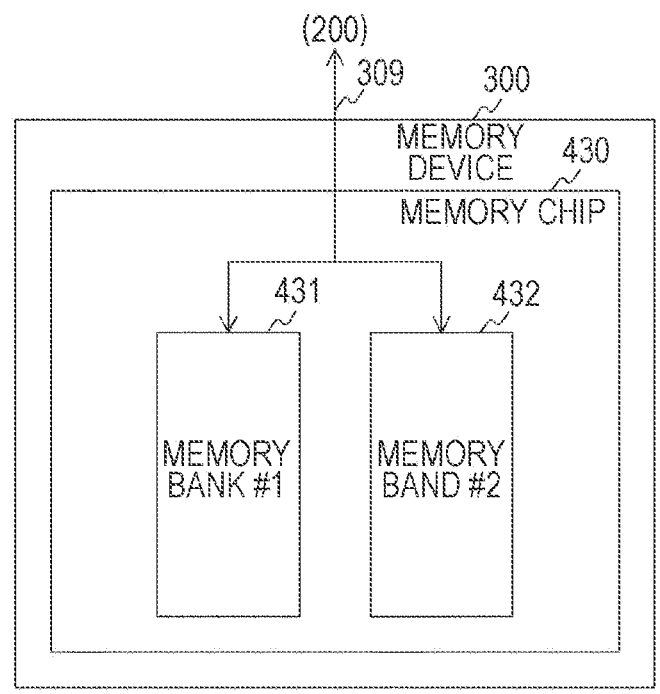
FIG. 24 is a diagram showing an example configuration of a memory device 300 according to a modification of an embodiment of the present technology.

FIG. 24 is a diagram showing an example configuration of a memory device 300 according to a modification of an embodiment of the present technology. The memory device 300 includes a memory chip 430. Further, the memory chip 430 includes a memory bank #1 (431) and a memory bank #2 (432). The memory bank #1 (431) and the memory bank #2 (432) can be accessed independently of each other, and are capable of receiving write requests from the memory controller 200 independently of each other. It should be noted that the memory bank #1 (431) and the memory bank #2 (432) are an example of the memory modules of the claims.

The configurations of the memory controller 200 and the memory device 300 except for this aspect are similar to the configurations of the memory controller 200 and the memory device 300 according to the first embodiment of the present technology, and therefore, explanation of them is not repeated herein.

As described above, in the embodiments of the present technology, a check is made to determine whether each of the plurality of memory modules is in a busy state, and the order of write request issuance is changed. Thus, the write time can be shortened in a storage device that includes memory modules having different write times.

It should be noted that the above described embodiment is an example for embodying the present technology, and the matter of the embodiment corresponds to the subject matter of the claims. Likewise, the subject matter of the claims corresponds to the matter under the same names as the subject matter of the claims in the embodiments of the present technology. However, the present technology is not limited to the embodiments, and various changes can be made to the embodiments without departing from the scope of the technology.

Also, the processing procedures described above in the embodiments may be regarded as a method involving the series of these procedures, or may be regarded as a program for causing a computer to carry out the series of these procedures or as a recording medium storing the program. This recording medium may be a compact disc (CD), a minidisc (MD), a digital versatile disc (DVD), a memory card, or a Blu-ray (registered trademark) disc, for example.

It should be noted that the advantageous effects described in this specification are merely examples, and the advantageous effects of the present technology may include other effects.

It should be noted that the present technology may also be embodied in the configurations described below.

(1) A memory controller including:
a plurality of write request holding units that hold a write request with respect to each of a plurality of memory modules, the write request being issued to request writing in each of the plurality of memory modules, the plurality of memory modules requiring different write times from one another; and
a selection unit that selects one of the plurality of write request holding units in accordance with memory state information indicating whether each of the plurality of memory modules is in a busy state, and causes outputting of the write request.

(2) The memory controller of (1), in which the selection unit selects one of the plurality of write request holding units corresponding to the memory modules not in a busy state.

(3) The memory controller of (1) or (2), in which the write request holding units are formed with queues that perform a first-in first-out operation on the write request.

(4) The memory controller of any of (1) to (3), further including
a memory state information holding unit that holds the memory state information,
in which the selection unit selects one of the plurality of write request holding units in accordance with the memory state information held in the memory state information holding unit.

(5) The memory controller of any of (1) to (4), further including
a data processing unit that performs predetermined preprocessing on write data associated with the write request before being outputted to the memory modules.

(6) The memory controller of (5), in which the data processing unit performs an encoding process to add parity for error detection and error correction to the write data associated with the write request, the encoding process being performed as the predetermined preprocessing.

(7) The memory controller of (5), in which the data processing unit performs a process of reading the write data associated with the write request from a host computer that has requested the writing, the process being performed as the predetermined preprocessing.

(8) The memory controller of (5), further including
a data holding unit that holds the write data subjected to the predetermined preprocessing.

(9) The memory controller of (8), in which, in a case where the write data is not held in the data holding unit, the selection unit selects one of the plurality of write request holding units in accordance with the memory state information.

(10) The memory controller of (9), in which
the selection unit selects one of the plurality of write request holding units corresponding to the memory modules not in a busy state, and,
if all the memory modules are in a busy state, the selection unit selects one of the plurality of write request holding units corresponding to the memory modules in a busy state.

(11) The memory controller of any of (1) to (10), in which
the plurality of write request holding units hold the write request and write data associated with the write request with respect to each of the plurality of memory modules, and
the selection unit selects one of the plurality of write request holding units in accordance with the memory state information, and causes outputting of the write request and the write data.

(12) A storage device including:
a plurality of memory modules requiring different write times from one another;
a plurality of write request holding units that hold a write request with respect to each of the plurality of memory modules, the write request being issued to request writing in each of the plurality of memory modules; and
a selection unit that selects one of the plurality of write request holding units in accordance with memory state information indicating whether each of the plurality of memory modules is in a busy state, and causes outputting of the write request.

(13) An information processing system including:
a storage device including:
    a plurality of memory modules requiring different write times from one another;
    a plurality of write request holding units that hold a write request with respect to each of the plurality of memory modules, the write request being issued to request writing in each of the plurality of memory modules; and
    a selection unit that selects one of the plurality of write request holding units in accordance with memory state information indicating whether each of the plurality of memory modules is in a busy state, and causes outputting of the write request; and
a host computer that requests the storage device to perform the writing.

(14) A memory control method including:
a selection process of selecting one of a plurality of write request holding units in accordance with memory state information, and causing outputting of a write request, the plurality of write request holding units holding the write request with respect to each of a plurality of memory modules, the write request being issued to request writing in each of the plurality of memory modules, the plurality of memory modules requiring different write times from one another, the memory state information indicating whether each of the plurality of memory modules is in a busy state.

REFERENCE SIGNS LIST

100 Host computer
200 Memory controller
201 Host interface
202 Memory interface
210 Write request generation unit
220 Data processing unit
221 Data transfer control unit
222 ECC processing unit
230 Write request management unit
231, 232 Write request selection unit
233 to 236 Queue
240 Memory selection information generation unit
260 Write request processing unit
270 Memory state information holding unit
280 Write request control unit
281, 284, 286 Output control unit
282, 287 Write request buffer
283 Request selection unit
285, 288 Write data buffer
289 Data selection unit
290 Write command management unit
300 Memory device
310, 320, 410, 420 Memory module
411, 421, 422, 430 Memory chip
431, 432 Memory bank

The invention claimed is:

1. A memory controller, comprising:
a plurality of write request holding units configured to:
hold a plurality of write requests with respect to a plurality of memory modules, wherein
a corresponding write request of the plurality of write requests is issued to request a writing operation in each memory module of the plurality of memory modules, and
a first write time corresponding to a first memory module of the plurality of memory modules is different from a second write time corresponding to a second memory module of the plurality of memory modules; and
generate held request information based on the plurality of write requests held by the plurality of write request holding units;
a data holding unit configured to hold write data subjected to a specific preprocessing operation;
an output control unit configured to output write data information, wherein the write data information indicates whether the write data is held in the data holding unit; and
a selection unit configured to:
determine a busy state of each memory module of the plurality of memory modules;
select a write request holding unit of the plurality of write request holding units based on the determined busy state, the write data information, and the held request information, such that an order of issuance of the plurality of write requests corresponding to the plurality of write request holding units is changed; and
output a write request of the plurality of write requests corresponding to the selected write request holding unit based on the changed order of issuance of the plurality of write requests.

2. The memory controller according to claim 1, wherein the selection unit is further configured to select the write request holding unit corresponding to the first memory module that is in an idle state.

3. The memory controller according to claim 1, wherein the plurality of write request holding units includes queues configured to execute a first-in first-out operation on the plurality of write requests.

4. The memory controller according to claim 1, further comprising
a memory state information holding unit configured to hold memory state information,
wherein the selection unit is further configured to select the write request holding unit of the plurality of write request holding units based on the memory state information held in the memory state information holding unit.

5. The memory controller according to claim 1, further comprising
a data processing unit configured to execute the specific preprocessing operation on the write data prior to output of the write data to the plurality of memory modules, wherein the write data is associated with the plurality of write requests.

6. The memory controller according to claim 5, wherein the data processing unit is further configured to execute an encoding process to add parity for error detection and error correction to the write data associated with the plurality of write requests, and
the encoding process corresponds to the specific preprocessing operation.

7. The memory controller according to claim 5, wherein the data processing unit is further configured to execute a reading process of the write data from a host computer, the write data is associated with the plurality of write requests from the host computer that has requested the writing operation, and
the reading process corresponds to the specific preprocessing operation.

8. The memory controller according to claim 5, wherein the selection unit is further configured to select the write request holding unit of the plurality of write request holding units based on absence of the write data in the data holding unit.

9. The memory controller according to claim 8, wherein the selection unit is further configured to:
select a first write request holding unit of the plurality of write request holding units corresponding to the first memory module that is in an idle state; and
select, in a case where each memory module of the plurality of memory modules is in the busy state, a second write request holding unit of the plurality of write request holding units,
wherein the second write request holding unit corresponds to the second memory module that is in the busy state.

10. A storage device, comprising:
a plurality of memory modules, wherein
a first write time corresponding to a first memory module of the plurality of memory modules is different from a second write time corresponding to a second memory module of the plurality of memory modules;
a plurality of write request holding units configured to:
hold a plurality of write requests with respect to the plurality of memory modules, wherein a corresponding write request of the plurality of write requests is issued to request a writing operation in each memory module of the plurality of memory modules; and generate held request information based on the plurality of write requests held by the plurality of write request holding units;

a data holding unit configured to hold write data subjected to a specific preprocessing operation;

an output control unit configured to output write data information, wherein the write data information indicates whether the write data is held in the data holding unit; and a selection unit configured to:
determine a busy state of each memory module of the plurality of memory modules;
select a write request holding unit of the plurality of write request holding units based on the determined busy state, the write data information, and the held request information, such that an order of issuance of the plurality of write requests corresponding to the plurality of write request holding units is changed; and
output a write request of the plurality of write requests corresponding to the selected write request holding unit based on the changed order of issuance of the plurality of write requests.

11. An information processing system, comprising:
a storage device including:
a plurality of memory modules, wherein
a first write time corresponding to a first memory module of the plurality of memory modules is different from a second write time corresponding to a second memory module of the plurality of memory modules;
a plurality of write request holding units configured to:
hold a plurality of write requests with respect to the plurality of memory modules, wherein
a corresponding write request of the plurality of write requests is issued to request a writing operation in each memory module of the plurality of memory modules; and
generate held request information based on the plurality of write requests held by the plurality of write request holding units;
a data holding unit configured to hold write data subjected to a specific preprocessing operation;
an output control unit configured to output write data information, wherein the write data information indicates whether the write data is held in the data holding unit; and
a selection unit configured to:
determine a busy state of each memory module of the plurality of memory modules;
select a write request holding unit of the plurality of write request holding units based on the determined busy state, the write data information, and the held request information, such that an order of issuance of the plurality of write requests corresponding to the plurality of write request holding units is changed; and
output a write request of the plurality of write requests corresponding to the selected write request holding unit based on the changed order of issuance of the plurality of write requests; and
a host computer configured to request the storage device to perform the writing operation.

12. A memory control method, comprising:
generating held request information based on a plurality of write requests held by a plurality of write request holding units;
holding, in a data holding unit, write data subjected to a specific preprocessing operation;
outputting write data information, wherein the write data information indicates whether the write data is held in the data holding unit;
determining a busy state of each memory module of a plurality of memory modules;
selecting a write request holding unit of the plurality of write request holding units based on the determined busy state, the write data information, and the held request information, such that an order of issuance of the plurality of write requests corresponding to the plurality of write request holding units is changed; and
outputting a write request of the plurality of write requests corresponding to the selected write request holding unit based on the changed order of issuance of the plurality of write requests, wherein
the plurality of write request holding units holds the plurality of write requests with respect to each memory module of the plurality of memory modules,
a corresponding write request of the plurality of write requests is issued to request writing in each memory module of the plurality of memory modules, and
a first write time corresponding to a first memory module of the plurality of memory modules is different from a second write time corresponding to a second memory module of the plurality of memory modules.

* * * * *